(12) United States Patent
Fung et al.

(10) Patent No.: US 12,113,643 B2
(45) Date of Patent: *Oct. 8, 2024

(54) SLEEP SIGNALING HANDSHAKE FOR ETHERNET

(71) Applicant: Marvell Asia Pte Ltd, Singapore (SG)

(72) Inventors: Hon Wai Fung, Newark, CA (US); Dance Wu, Palo Alto, CA (US)

(73) Assignee: Marvel Asia Pte Ltd, Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 18/502,963

(22) Filed: Nov. 6, 2023

(65) Prior Publication Data

US 2024/0073059 A1 Feb. 29, 2024

Related U.S. Application Data

(63) Continuation of application No. 17/490,638, filed on Sep. 30, 2021, now Pat. No. 11,811,551.

(60) Provisional application No. 63/085,692, filed on Sep. 30, 2020.

(51) Int. Cl.
*H04L 12/40* (2006.01)
*H04L 12/10* (2006.01)

(52) U.S. Cl.
CPC ........ *H04L 12/40039* (2013.01); *H04L 12/10* (2013.01); *H04L 12/40013* (2013.01); *H04L 12/40045* (2013.01); *H04L 2012/40273* (2013.01)

(58) Field of Classification Search
CPC ............... H04L 12/40039; H04L 12/10; H04L 12/40013; H04L 12/40045; H04L 2012/40273; H04L 12/12; Y02D 10/00; Y02D 30/50; G06F 1/3246; G06F 1/3253; G06F 1/3209

See application file for complete search history.

(56) References Cited

U.S. PATENT DOCUMENTS

| | | |
|---|---|---|
| 11,811,551 B2 | 11/2023 | Fung et al. |
| 2004/0218556 A1 | 11/2004 | Son et al. |
| 2009/0204836 A1 | 8/2009 | Diab et al. |
| 2010/0046543 A1 | 2/2010 | Parnaby |
| 2016/0182175 A1 | 6/2016 | Landau et al. |
| 2021/0282087 A1 | 9/2021 | Den Besten |

OTHER PUBLICATIONS

Axer et al., "802.3bp Sleep/Wake-up Specification—TC10—OPEN Sleep/Wake-up Specification for Automotive Gigabit Ethernet," v. 0.10, OPEN Alliance, 17 pages (Jul. 28, 2021).

(Continued)

*Primary Examiner* — Jaweed A Abbaszadeh
*Assistant Examiner* — Brian J Corcoran

(57) ABSTRACT

A first communication device performs a handshaking procedure with a second communication device, the handshaking procedure associated with transitioning from an active mode to a low power mode. The first communication device transmits data and/or idle symbols to the second communication device i) after completion of the handshake procedure, and ii) at least until the earlier of a) a time period expiring, and b) determining that the second communication device quieted a transmitter of the second communication device. The first communication device transitions to the low power mode in connection with the handshaking procedure.

21 Claims, 11 Drawing Sheets

(56) References Cited

OTHER PUBLICATIONS

Axer et al., "OPEN Sleep/Wake-up Specification Sleep/Wake-up Specification for Automotive Ethernet," OPEN Alliance, Feb. 25, 2017 (17 pages).
IEEE Std 802.3cg/D3.4 "Draft Standard for Ethernet Amendment: Physical Layer Specifications and Management Parameters for 10 Mb/s Operation and Associated Power Delivery over a Single Balanced Pair of Conductors," IEEE Computer Society, Sep. 11, 2019 (254 pages).
IEEE Std 802.3ch-2020 "IEEE Standard for Ethernet—Amendment 8: Physical Layer Specifications and Management Parameters for 2.5 GB/s, 5 GB/s, and 10 GB/s Automotive Electrical Ethernet," IEEE Computer Society, pp. 1-207 (Jun. 30, 2020).
International Search Report and Written Opinion for Application No. PCT/US2021/052877, mailed Jan. 26, 2022 (14 pages).
Lo, "Link Monitoring, IEEE 802.3bp—Interim Meeting—Jan. 2015," Marvell Semiconductor, 12 pages (Jan. 2015).
McClellan, "Proposed Baseline Text for PMA," IEEE 802.3bp 1000BASE-T1 Task Force, 13 pages (Jan. 6, 2015).
Tu et al., "Proposed Changes to State Diagrams," IEEE 802.3ch Task Force, 15 pages (Apr. 3, 2019).

SLEEP SIGNALING HANDSHAKE FOR ETHERNET

CROSS REFERENCES TO RELATED APPLICATIONS

The present application is a continuation of U.S. application Ser. No. 17/490,638 (now U.S. Pat. No. 11,811,551), filed on Sep. 30, 2021, entitled "Sleep Signaling Handshake for Ethernet," which claims the benefit of U.S. Provisional Patent App. No. 63/085,692, entitled "Sleep Handshaking Race Resolution," filed on Sep. 30, 2020. Both of the applications referenced above are hereby incorporated by reference in their entireties.

FIELD OF TECHNOLOGY

The present disclosure relates generally to communication technology, and more particularly to power saving techniques for devices that communicate via a communication link.

BACKGROUND

Technical Committee 10 (TC10) of the OPEN Alliance, has proposed mechanisms for one device to instruct, via an automotive communication link, another device to transition to a low power mode (sleep mode), and to instruct, via the automotive communication link, the other device to transition to an active mode. For example, when the one device wants the other device to transition to the sleep mode, the one device transmits a low power sleep (LPS) request via the communication link. As another example, when the one device wants the other device to transition to the active mode and the communication link is already active, the one device transmits a wake-up request (WUR) via the communication link. If the communication link is not active, the one device transmits a wake-up pulse (WUP) to the other device to prompt the other device to transition to the active mode. Regarding LPS requests, TC10 has also proposed a handshaking procedure that involves one device transmitting a first LPS request to a link partner and receiving, from the link partner, a second LPS request that signals an intention of the link partner to enter the sleep mode.

FIG. 1 is a state diagram 100, previously proposed by TC10, associated with a communication device transitioning between an active mode of operation and the sleep mode. The state diagram 100 is implemented by a state machine of the communication device, such as a state machine of a physical layer (PHY) processor of the communication device. A state 104 ("normal state 104") corresponds to the active mode of operation. In the normal state 104, the PHY processor generally transmits data and/or idle symbols to a link partner via a communication link, and receives data and/or idle symbols from the link partner via the communication link. In the normal state 104, various parameters are set to logical values TRUE or FALSE. For example, a sleep_fail parameter, which when TRUE indicates that the handshaking procedure with the link partner (discussed above) has failed, is set to FALSE. An inhibit parameter, which when TRUE indicates that a power supply shutdown is inhibited, is set to TRUE. When inhibit is TRUE, the communication device is not permitted to transition to the sleep mode. A sleep parameter, which when TRUE notifies the PHY processor that transmission by the PHY processor via the communication link is disabled, is set to FALSE. A tx_lps parameter, which when TRUE indicates that the PHY processor has transmitted (or has begun to transmit) an LPS request to the link partner, is set to FALSE.

In response to receiving an LPS request from the link partner (and when a sleep capability of the PHY processor is enabled), the state machine of the communication device transitions from the normal state 104 to a state 108 ("sleep ack state 108") associated with confirming whether the communication device wants to transition to the sleep mode. In the sleep ack state 108, the communication device determines whether transition to the sleep mode should be aborted. For example, if the PHY processor is receiving an incoming data message that is to be transmitted to the link partner, the communication device determines that transition to the sleep mode should be aborted and the state machine transitions back to the normal state 104. On the other hand, if the communication device determines in the sleep ack state 108 that the transition to the sleep mode should go forward, the communication device sets a parameter loc_sleep_req to TRUE.

In the sleep ack state 108 (or at least when the communication device has not immediately determined to abort the transition to the sleep mode), the communication device starts a timer ("sleep_ack_timer") that measures a time period in which the communication device determines whether to abort the transition to the sleep mode. In an embodiment, the sleep_ack_timer is set to measure an 8 milliseconds time period. In other embodiments, the sleep_ack_timer is set to measure another suitable time period different from 8 milliseconds.

In the sleep ack state 108, if the parameter loc_sleep_req is TRUE when the sleep_ack_timer expires, the state machine transitions to a state 112 ("sleep request state 112"), which corresponds to determining whether completion of the handshaking procedure discussed above has been completed.

Referring again to the normal state 104, if the communication device determines on its own volition (i.e., not in response to an LPS request from the link partner) that the communication device should transition to the sleep mode ("local sleep request") when the communication link with the link partner is up ("link OK") (and when a sleep capability of the PHY processor is enabled), the state machine transitions from the normal state 104 to the sleep request state 112.

In the sleep request state 112, the communication device starts a timer ("sleep_req timer") that measures a time period in which the sleep handshaking procedure discussed above is to be completed. The sleep_req timer is set to measure a 16 milliseconds time period.

Also during the sleep request state 112, the communication device transmits an LPS request to the link partner. If the state machine entered the sleep request state 112 via the sleep ack state 108, the LPS request transmitted during the sleep request state 112 is responsive to a previous LPS request transmitted by the link partner, and thus the sleep handshaking procedure is completed upon transmission of the LPS request during the sleep request state 112. On the other hand, if the state machine entered the sleep request state 112 directly from the normal state 104 (i.e., not via the sleep ack state 108), the LPS request transmitted during the sleep request state 112 is a first LPS request and the link partner must transmit a second LPS request to complete the sleep handshaking procedure. Additionally, in some scenarios, the link partner independently begins transmitting an LPS request near the same time that the communication device begins transmitting an LPS request during the sleep request state 112, i.e., the link partner transmits an LPS request not strictly as part of the handshaking procedure after the communication device has already entered the sleep request state 112. Determining whether the sleep handshaking procedure has been completed in the sleep request state 112 includes determining whether an LPS request has been received from the link partner either i) while the state machine of the communication device is in the sleep request state 112, or ii) in connection with the state machine of the communication device transitioning from the normal state 104 to the sleep ack state 108. Thus, if the link partner independently begins transmitting an LPS request after the communication device has already begun transmitting an LPS request during the sleep request state 112, the communication device may determine that the handshaking procedure is completed in connection with receiving the LPS request from the link partner.

In connection with transmitting the LPS request in the sleep request state 112, the tx_lps parameter is set to TRUE to indicate that the communication device transmitted the LPS request (or has begun transmitting the LPS request).

If the communication device determines that the sleep handshaking procedure has not been completed when the sleep_req timer expires, the state machine transitions to a state 116 ("sleep fail state 116") that corresponds to the communication device determining that the transition to the sleep mode failed. In the sleep fail state 116, the communication device sets a parameter (sleep_fail) to TRUE to indicate that the transition to the sleep mode failed. Additionally, the state machine transitions to the normal state 104.

On the other hand, if the communication device determines in the sleep request state 112 that the sleep handshaking procedure has been completed before expiration of the sleep_req timer, the state machine transitions from the sleep request state 112 to a state 120 ("sleep silent state 120") that corresponds to the communication device quieting transmission by the communication device on the communication link.

In the sleep silent state 120, the communication device sets a parameter ("sleep") to TRUE to indicate that the communication device is in the sleep mode, and quiets transmission by the communication device on the communication link. If the communication device determines that the link partner is transmitting on the communication link prior to the sleep_req timer expiring, the state machine transitions to the sleep fail state 116. For example, if the link partner did not recognize the LPS request transmitted by the communication device (e.g., because of noise on the communication link or some other reason), the link partner may transition back to the normal state 104 and transmit idle symbols and/or data symbols. On the other hand, if the communication device determines that the link partner has quieted its transmitter when the sleep silent timer expires, the state machine transitions to a sleep state 124.

During the sleep state 124, the inhibit parameter is set to FALSE to indicate that power supply shutdown is not inhibited, and the communication device enters a low power mode. For example, the PHY processor may be put into a low power mode in which power consumption is significantly reduced (e.g., at least 90% reduced) as compared to the normal operating state 104, according to an embodiment. The PHY processor is unable to transmit (and optionally is unable to receive data and/or idle symbols) in the sleep state, according to an embodiment.

During the sleep state 124, if the communication device determines that the communication device should transition to the active mode on its own volition (i.e., not in response to a wake-up command (e.g., a WUP) from the link partner), or in response to receiving a wake-up command (e.g., a WUP) from the link partner, the state machine transitions from the sleep state 124 to the normal state 104. In connection with transitioning from the sleep state 124 to the normal state 104, the communication device exits the low power mode. For example, the power supply to the PHY processor is restored, according to an embodiment.

SUMMARY

In an embodiment, a first communication device comprises: a physical layer (PHY) processor comprising a transceiver, the PHY processor being configured to perform PHY functions associated with a communication link including transmitting information to a second communication device via a communication medium corresponding to the communication link and receiving information from the second communication device via the communication medium, wherein the PHY processor is configured to transition between an active mode and a low power mode; and a controller, the controller being configured to: control the PHY processor to perform a handshaking procedure with the second communication device for transitioning to the low power mode, control the PHY processor to continue to transmit data and/or idle symbols to the second communication device i) after completion of the handshake procedure, and ii) at least until the earlier of a) a time period expiring, and b) determining that the second communication device quieted a transmitter of the second communication device, and control the PHY processor to transition to the low power mode in connection with the handshaking procedure.

In another embodiment, a method for transitioning a first communication device between an active mode and a low power mode includes: performing, by the first communication device, a handshaking procedure with a second communication device for transitioning to the low power mode; transmitting, by the first communication device, data and/or idle symbols to the second communication device i) after completion of the handshake procedure, and ii) at least until the earlier of a) a time period expiring, and b) determining that the second communication device quieted a transmitter of the second communication device; and transitioning the first communication device to the low power mode in connection with the handshaking procedure.

DETAILED DESCRIPTION

Figure 1:
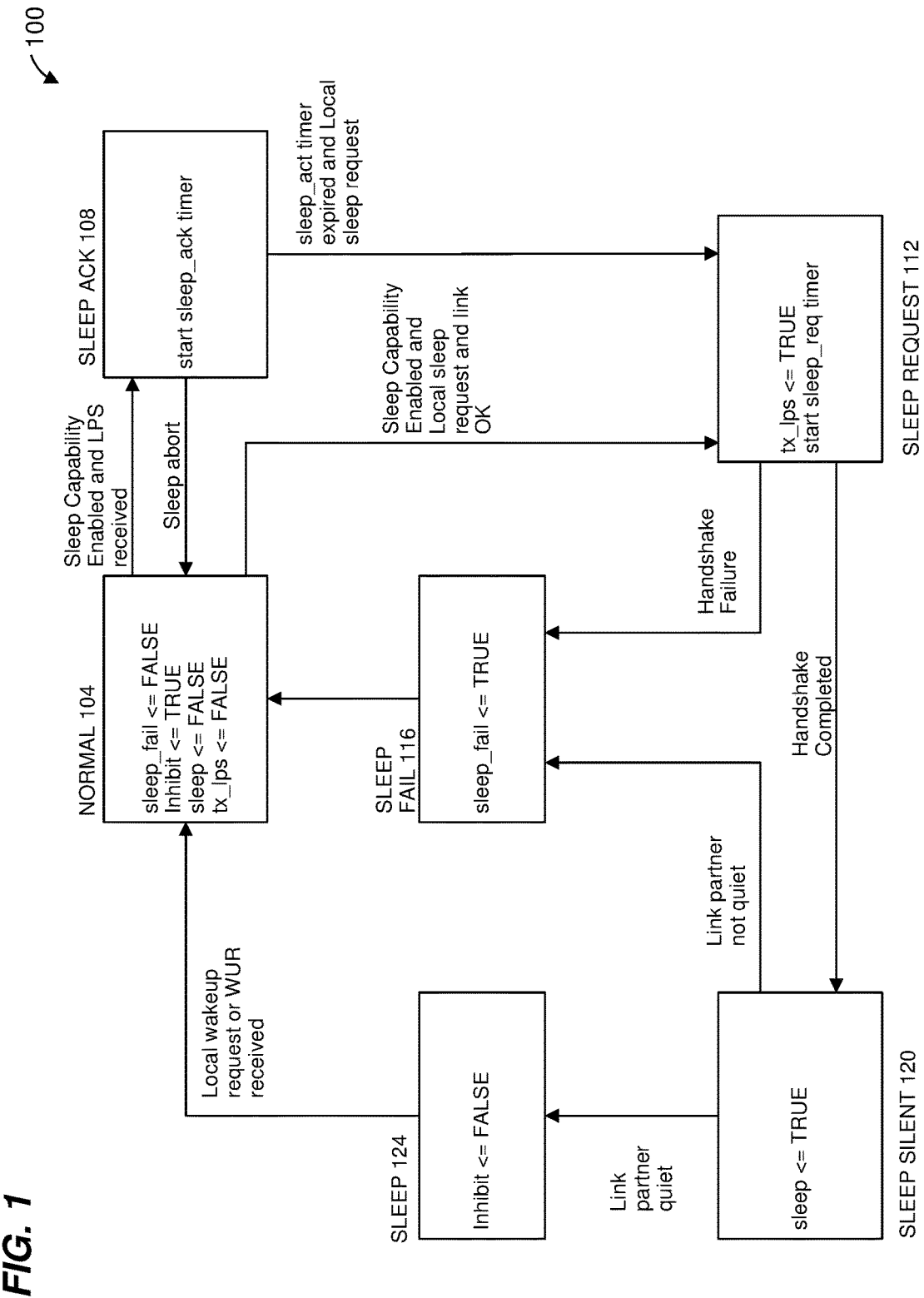
FIG. 1 is a prior art state diagram associated with a communication device transitioning between an active mode of operation and a sleep mode.

In the state diagram 100 of FIG. 1, a potential race condition exists regarding the transition from the sleep request state 112 to the sleep silent state 120. As discussed above, when a first communication device has received a first LPS request from a second communication device the first communication device will transmit (in sleep request state 112) a second LPS request to the first communication device as part of the sleep handshaking procedure. Then, the first communication device transitions to the sleep silent state 120 and quiets a transmitter of the first communication device. Thus, immediately after transmission of the second LPS request, the transmit link from the first communication device to the second communication device goes silent. The IEEE 802.3 bp Standard specifies that if a communication device does not detect transmission symbol transitions on a communication link for 2 microseconds (±0.1 microseconds), the communication device determines that the communication link has failed. In response to determining that the communication link has failed, the communication device may abort processing of received frames, including the second LPS request, and thus may determine that the handshaking procedure failed.

To address the race condition discussed above, a state machine described below (which operates according to a state diagram that includes elements similar to some elements the state diagram 100 of FIG. 1) helps ensure that, when a first communication device transmits an LPS request (e.g., in a state similar to the sleep request state 112 of FIG. 1) to a second communication device, the first communication device does not quiet the transmitter (e.g., the state machine does not transition to a state the same as or similar to the sleep silent state 120) of the first communication device until the second communication device has had sufficient time to process the LPS request, according to some embodiments.

Figure 2:
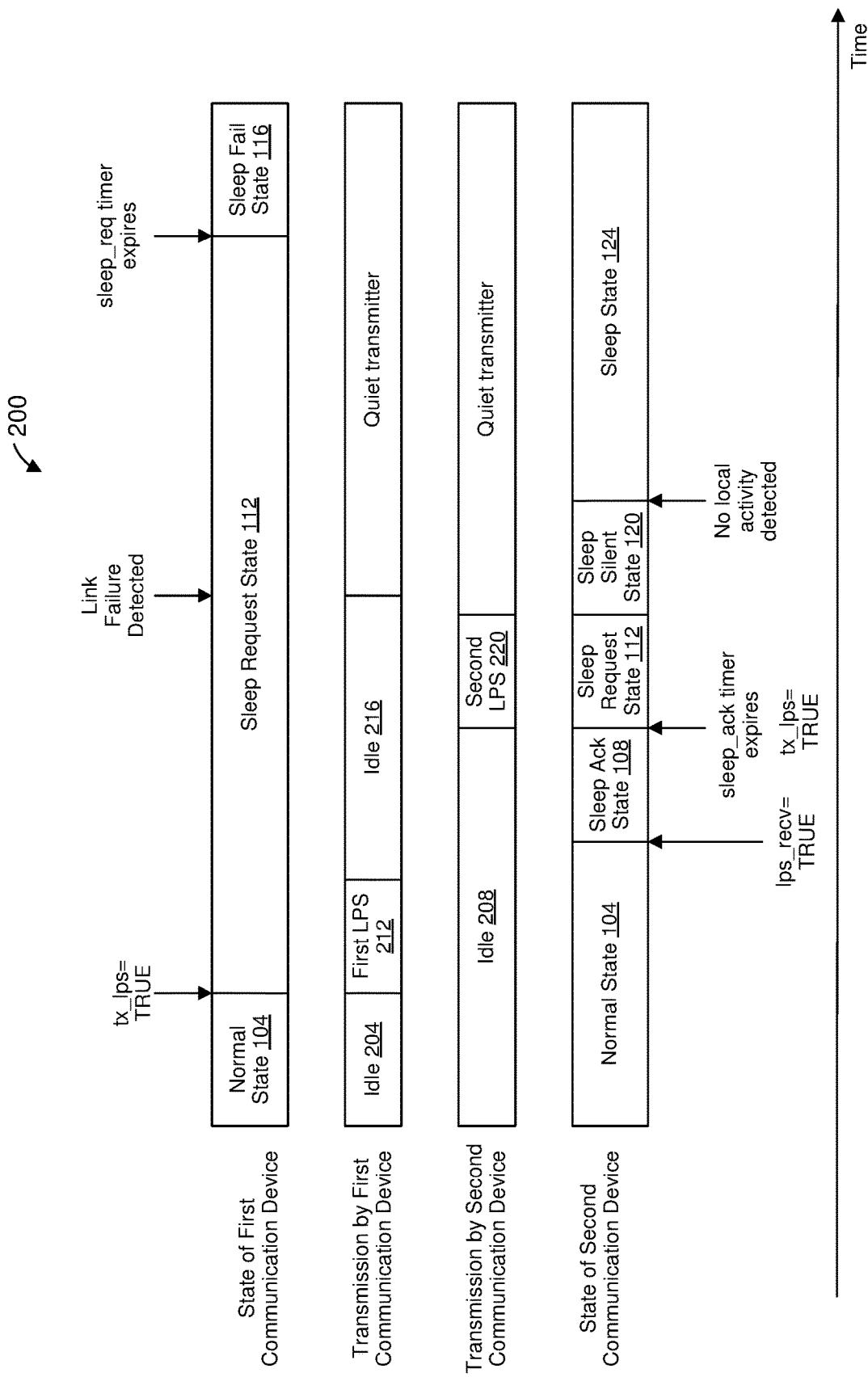
FIG. 2 is a diagram illustrating a scenario in which a race condition occurs with a first communication device and a second communication device operating according to the prior art state diagram of FIG. 1.

FIG. 2 is a diagram illustrating a scenario in which a race condition occurs with a first communication device and a second communication device operating according to the prior art state diagram 100 of FIG. 1. As will be discussed below, the race condition results in the first communication device inadvertently determining that a communication link between the first communication device and the second communication device has failed, which may lead to the first communication device to attempt to reestablish the communication link and consume power unnecessarily.

Initially, the first communication device and the second communication device are in the normal state 104 and are transmitting idle symbols 204 and idle symbols 208, respectively. The first communication device transitions to the sleep request state 112 and transmits a first LPS request 212 to the second communication device. Additionally, the first communication device starts the sleep_req timer. After transmitting the first LPS request 212, the first communication device transmits idle symbols 216.

After receiving and processing the first LPS request 212, the second communication device transitions to the sleep ack state 108, starts the sleep_ack timer, and continues transmitting idle symbols 208. Upon the sleep_ack timer expiring, the second communication device transitions to the sleep request state 112 and transmits a second LPS request 220 to the second communication device.

After transmission of the second LPS request 220, the second communication device immediately transitions to the sleep silent state 120 and quiets a transmitter of the second communication device. The second communication device immediately transitions to the sleep silent state 120 because the second communication device determines the handshaking procedure is completed, i.e., the second communication device received the first LPS request 212 and transmitted the second LPS request 220.

Before the first communication device is able to complete processing of the second LPS request 220 from the second communication device, the first communication device determines that the link has failed because the second communication device quieted the transmitter of the second communication device. In response to determining that the link has failed, the first communication device aborts processing the second LPS request 220 and quiets a transmitter of the first communication device. Thus, the first communication device does not detect that the second LPS 220 was received.

Eventually, the sleep_req timer of the first communication device expires. Because the first communication device determined that the link had failed and therefore did not detect that the second LPS 220 was received, the first communication device transitions to the sleep fail state 116 when the time the sleep_req timer expires. Additionally, because the first communication device inadvertently determined that the link between the first communication device and the second communication device has failed, the first communication device may enter a link recovery state that includes transmitting idle symbols to the second communication device. Thus, entry by the first communication device into the sleep state and the first communication device may consume additional power unnecessarily.

Figure 3:
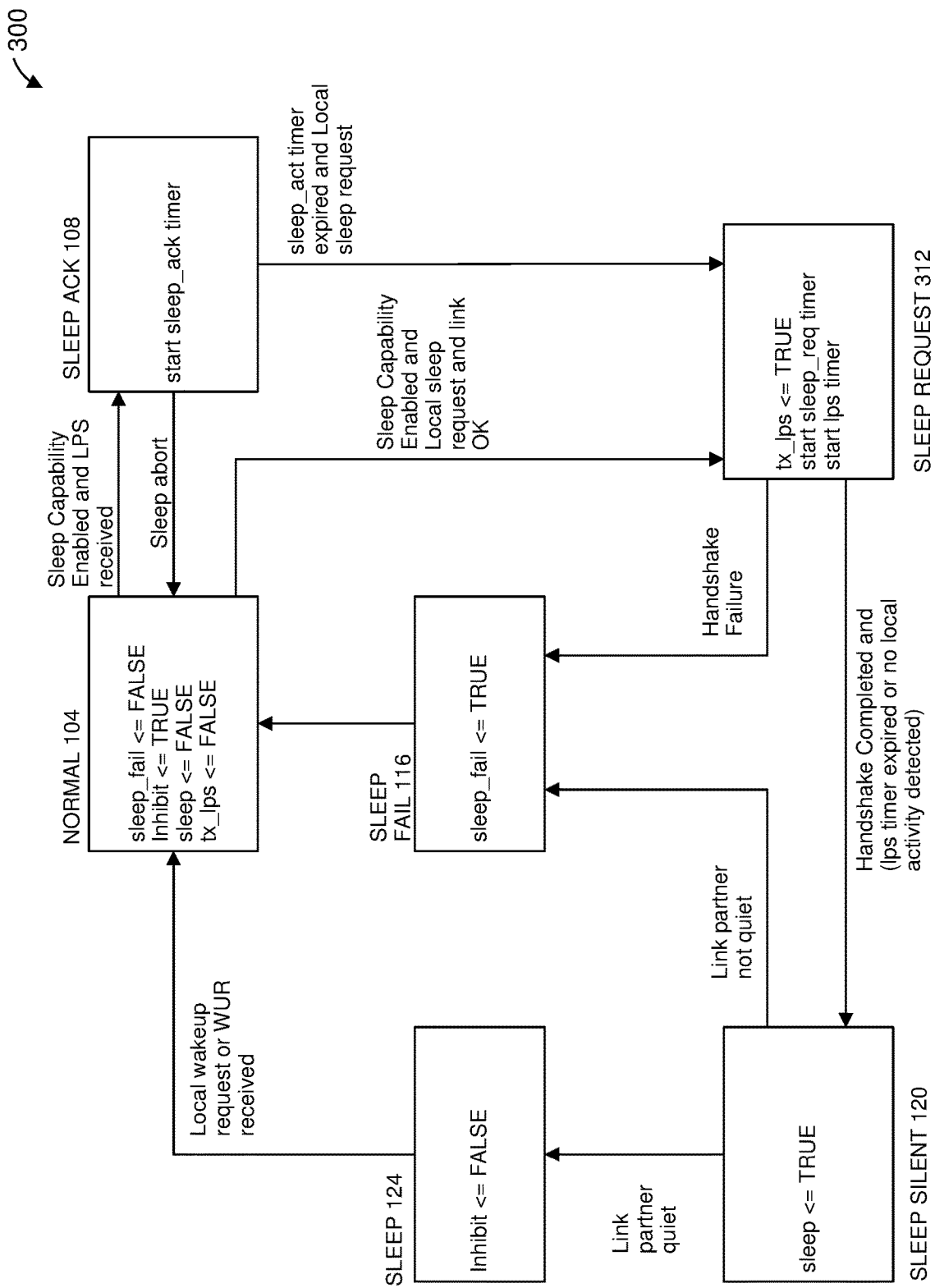
FIG. 3 is a state diagram associated with a communication device transitioning between an active mode of operation and a sleep mode, according to an embodiment.

FIG. 3 is a state diagram 300 associated with a communication device transitioning between an active mode of operation and the sleep mode, according to an embodiment. As will be explained below, the state diagram 300 addresses the race condition discussed above by helping to ensure that, when a first communication device transmits an LPS request (e.g., in a state similar to the sleep request state 112 of FIG. 1) to a second communication device, the first communication device does not quiet the transmitter of the first communication device (e.g., the state machine does not transition to a state the same as or similar to the sleep silent state 120) until the second communication device has had sufficient time to process the LPS request, according to some embodiments. For example, the first communication device does not quiet the transmitter of the first communication device (e.g., the state machine does not transition to a state the same as or similar to the sleep silent state 120) until the first communication device determines that the second communication device quieted the transmitter of the second communication device, which indicates that the second communication device detected the LPS request, according to an embodiment. As another example, the first communication device does not quiet the transmitter of the first communication device (e.g., the state machine does not transition to a state the same as or similar to the sleep silent state 120) until a timer expires, where the timer measures a maximum time period for the second communication device to receive, process, and detect the LPS request, according to an embodiment. As another example, the first communication device does not quiet the transmitter of the first communication device (e.g., the state machine does not transition to a state the same as or similar to the sleep silent state 120) until the earlier of i) the first communication device determines that the second communication device quieted the transmitter of the second communication device, and ii) the timer expires.

The state diagram 300 has states similar to the state diagram 100 of FIG. 1, and like-numbered elements are not discussed again in detail for purposes of brevity.

The state diagram 300 includes a state 312 (sleep request state 312) corresponding to completion of the handshaking procedure discussed above with reference to FIG. 1. Referring again to the normal state 104, if the communication device determines on its own volition (i.e., not in response to an LPS request from the link partner) that the communication device should transition to the sleep mode ("local sleep request") when the communication link with the link partner is up ("link OK") (and when a sleep capability of the PHY processor is enabled), the state machine transitions from the normal state 104 to the sleep request state 312.

In the sleep request state 312, the communication device starts a timer ("sleep_req timer") that measures a time period in which the sleep handshaking procedure discussed above is to be completed. In an embodiment, the sleep_req timer is set to measure a 16 milliseconds time period. In other embodiments, the sleep_req timer is set to measure another suitable time period different from 16 milliseconds. In an embodiment, the sleep_req timer is set to measure approximately 16 milliseconds (i.e., 16 milliseconds±0.16 milliseconds). In other embodiments, the sleep_req timer is set to measure another suitable time period different from 16 milliseconds.

Also during the sleep request state 312, the communication device transmits an LPS request to the link partner. If the state machine entered the sleep request state 312 via the sleep ack state 108, the LPS request transmitted during the sleep request state 312 is responsive to a previous LPS request received from the link partner, and thus the sleep handshaking procedure is completed upon transmission of the LPS request during the sleep request state 312. On the other hand, if the state machine entered the sleep request state 312 directly from the normal state 104 (i.e., not via the sleep ack state 108), the LPS request transmitted during the sleep request state 312 is a first LPS request and the link partner must transmit a second LPS request to complete the sleep handshaking procedure. Thus, determining whether the sleep handshaking procedure has been completed in the sleep request state 312 includes determining whether an LPS request has been received from the link partner either i) during the sleep request state 312, or ii) in connection with transitioning from the normal state 104 to the sleep ack state 108.

In connection with transmitting the LPS request in the sleep request state 312, the tx_1ps parameter is set to TRUE to indicate that the communication device transmitted the LPS request (or has begun transmitting the LPS request).

Also in state 312, the communication device starts another timer ("1ps timer") that measures a time period that corresponds to a maximum time period for the link partner to receive, process, and recognize the LPS request, according to an embodiment. In an embodiment, the 1ps timer is set to measure a 94.504 microseconds time period, ±0.936 microseconds. In other embodiments, the 1ps timer is set to measure another suitable time period different from 94.504 microseconds time period, ±0.936 microseconds (e.g., approximately 94.5 microseconds (i.e., 94.5±3 microseconds), approximately 95.5 microseconds (i.e., 95.5±3 microseconds), approximately 90 microseconds (i.e., 90±3 microseconds), approximately 100 microseconds (i.e., 100±3 microseconds, etc.).

If the communication device determines that the sleep handshaking procedure has not been completed when the sleep_req timer expires, the state machine transitions to the sleep fail state 116 that corresponds to the communication device determining that the transition to the sleep mode failed.

On the other hand, if the communication device determines in the sleep request state 312 that the sleep handshaking procedure has been completed before expiration of the sleep_req timer, the state machine of the communication device waits for the earlier of i) the 1ps timer to expire, and ii) detecting no transmission activity by the link partner, before transitioning to the sleep silent state 120 and quieting the transmitter of the communication device. While waiting for the earlier of i) the 1ps timer to expire, and ii) detecting no transmission activity by the link partner, the communication device transmits data and/or idle symbols, according to an embodiment. Because the communication device transmits data and/or idle symbols and does not quiet the transmitter of the communication device until the earlier of i) expiration of the 1ps timer, and ii) detecting no transmission activity by the link partner, the race condition discussed above with reference to FIG. 2 is avoided (or at least the probability of the race condition is significantly reduced as compared to a state machine operating according to the state diagram 100 of FIG. 1, i.e., reduced by at least 90%), at least in some embodiments.

Figure 4:
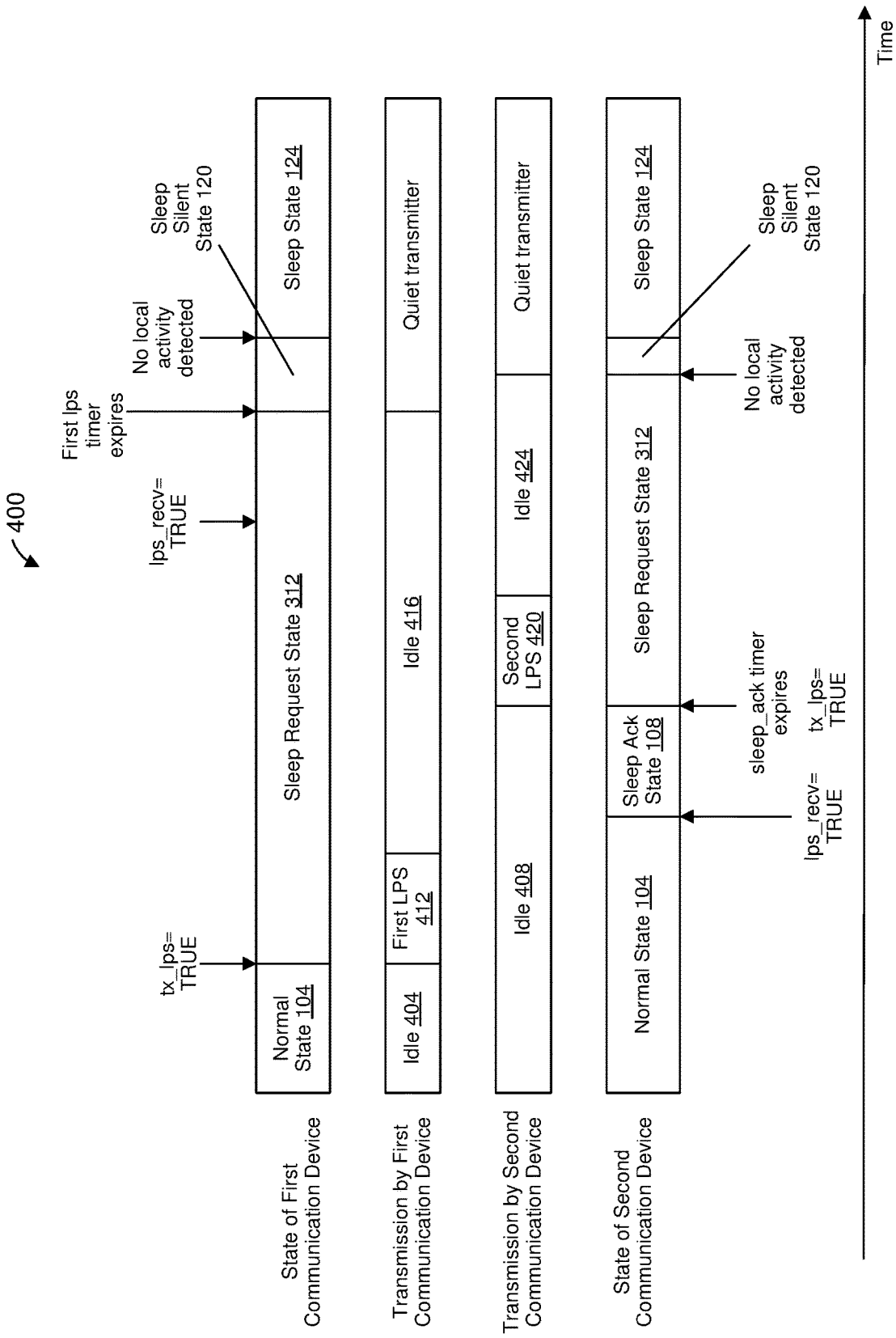
FIG. 4 is a diagram illustrating an example scenario in which a first communication device and a second communication device operate according to the state diagram of FIG. 3, according to an embodiment.

FIG. 4 is a diagram 400 illustrating an example scenario in which a first communication device and a second communication device operate according to the state diagram 300 of FIG. 3, according to an embodiment.

Initially, the first communication device and the second communication device are each in the normal state 104 and are transmitting data and/or idle symbols 404 and data and/or idle symbols 408, respectively. The first communication device transitions to the sleep request state 312 and transmits a first LPS request 412 to the second communication device. Additionally, the first communication device starts a first sleep_req timer and starts a first 1ps timer. After transmitting the first LPS request 412, the first communication device transmits idle symbols 416 (and/or data, optionally).

After receiving and processing the first LPS request 412, the second communication device transitions to the sleep ack state 108, starts a sleep_ack timer, and continues transmitting data and/or idle symbols 408. Upon the sleep_ack timer expiring, the second communication device transitions to the sleep request state 312 and transmits a second LPS request 420 to the second communication device. Additionally, the second communication device starts a second sleep_req timer and starts a second 1ps timer.

Further, after transmitting the second LPS request 420, the second communication device transmits idle symbols 424 (and/or data, optionally). Thus, unlike in the scenario of FIG. 2 in which the second communication device immediately transitions to the sleep silent state 120 and quiets a transmitter of the second communication device after transmitting the second LPS request 220, in the scenario of FIG. 4 the second communication device transmits idle symbols 424 (and/or data, optionally) immediately after transmitting the second LPS request 420. In particular, the second communication device transmits idle symbols 424 (and/or data, optionally) until the earlier of i) the second 1ps timer expires, or ii) the second communication device determines that the first communication device has quieted a first transmitter of the first communication device ("no local activity detected"), assuming that the second communication device determines that the handshaking procedure is completed.

While the first communication device is in the sleep request state 312, the first communication device detects the second LPS request 420 from the second communication device. Because the first communication device transmitted the first LPS request 412 and received the second LPS request 420, the first communication device determines that the handshaking procedure is completed. In the example scenario of FIG. 4, the 1ps timer expires after determining that the handshaking procedure is completed and prior to the first communication device detecting that the second communication device quieted the transmitter of the second communication device ("no local activity detected"). Thus, in response to the first communication device determining that the 1ps timer expired, the state machine of the first communication device transitions to the sleep silent state 120 and quiets the transmitter of the first communication device.

Because the second communication device received the first LPS request 412 and transmitted the second LPS request 420, the second communication device determines that the handshaking procedure is completed. In the example scenario of FIG. 4, the second communication device detects that the first communication device quieted the transmitter of the first communication device ("no local activity detected") prior to the 1ps timer expiring. Thus, in response to the second communication device detecting that the first communication device quieted the transmitter of the first communication device, the state machine of the second communication device transitions to the sleep silent state 120 and quiets the transmitter of the second communication device.

While in the sleep silent state 120, the first communication device detects no local activity and therefore transitions to the sleep state 124. Similarly, while in the sleep silent state 120, the second communication device detects no local activity and therefore also transitions to the sleep state 124.

Figure 5:
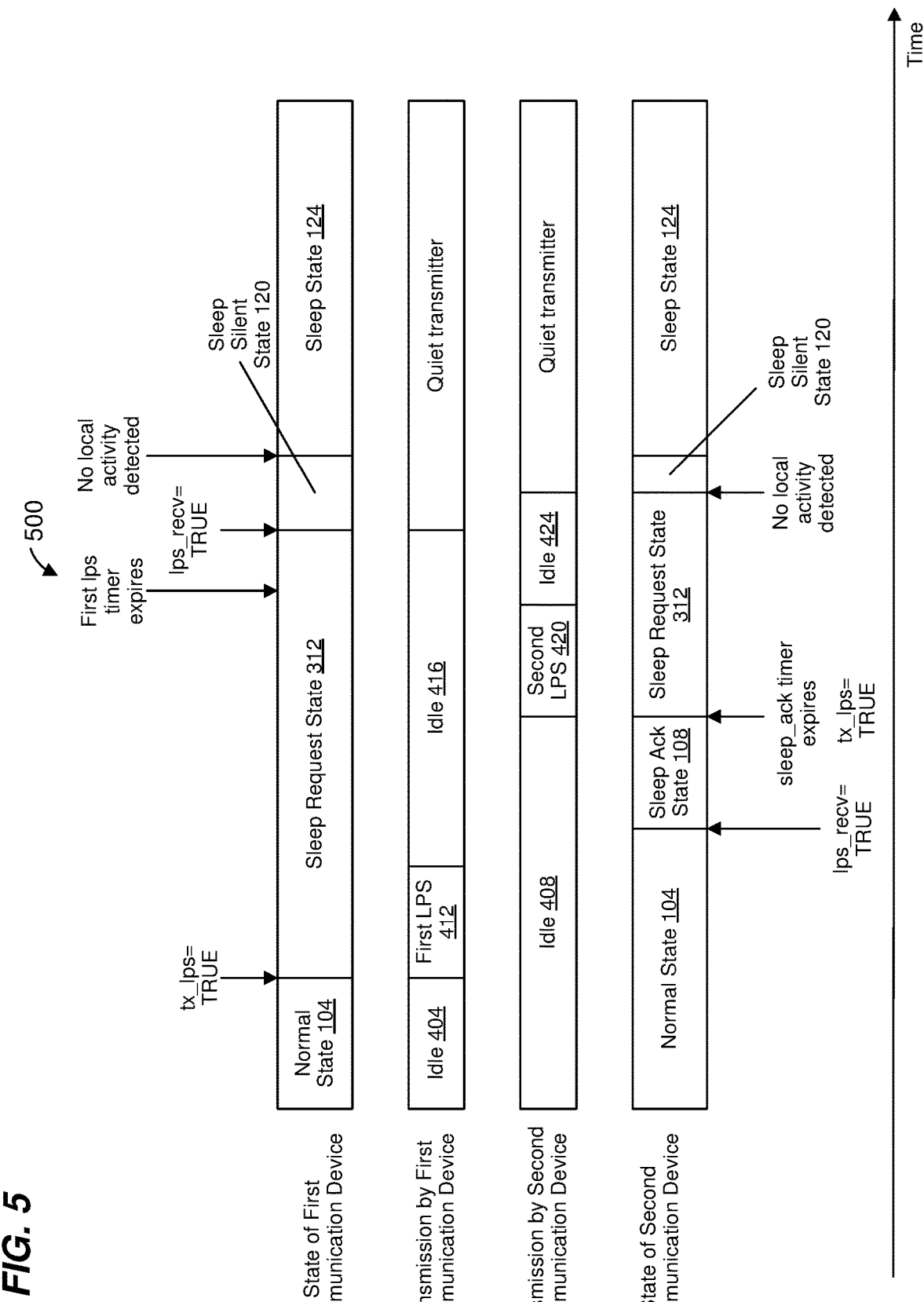
FIG. 5 is a diagram illustrating another example scenario in which a first communication device and a second communication device operate according to the state diagram of FIG. 3, according to an embodiment.

FIG. 5 is a diagram 500 illustrating another example scenario in which a first communication device and a second communication device operate according to the state diagram 300 of FIG. 3, according to an embodiment. The diagram 500 is similar to the diagram 400 of FIG. 4 except that the first communication device detects the second LPS request 420 after the 1ps timer expires and prior to determining that the second communication device quieted the transmitter of the second communication device ("no local activity detected"). Thus, in response to the first communication device detecting that the second LPS request 420 has been received, the state machine of the first communication device transitions to the sleep silent state 120 and quiets the transmitter of the first communication device.

Similar to the scenario of FIG. 4, the second communication device detects that the first communication device quieted the transmitter of the first communication device ("no local activity detected") prior to the 1ps timer expiring. Thus, in response to the second communication device detecting that the first communication device quieted the transmitter of the first communication device, the state machine of the second communication device transitions to the sleep silent state 120 and quiets the transmitter of the second communication device.

While in the sleep silent state 120, the first communication device detects no local activity and therefore transitions to the sleep state 124. Similarly, while in the sleep silent state 120, the second communication device detects no local activity and therefore also transitions to the sleep state 124.

Figure 6:
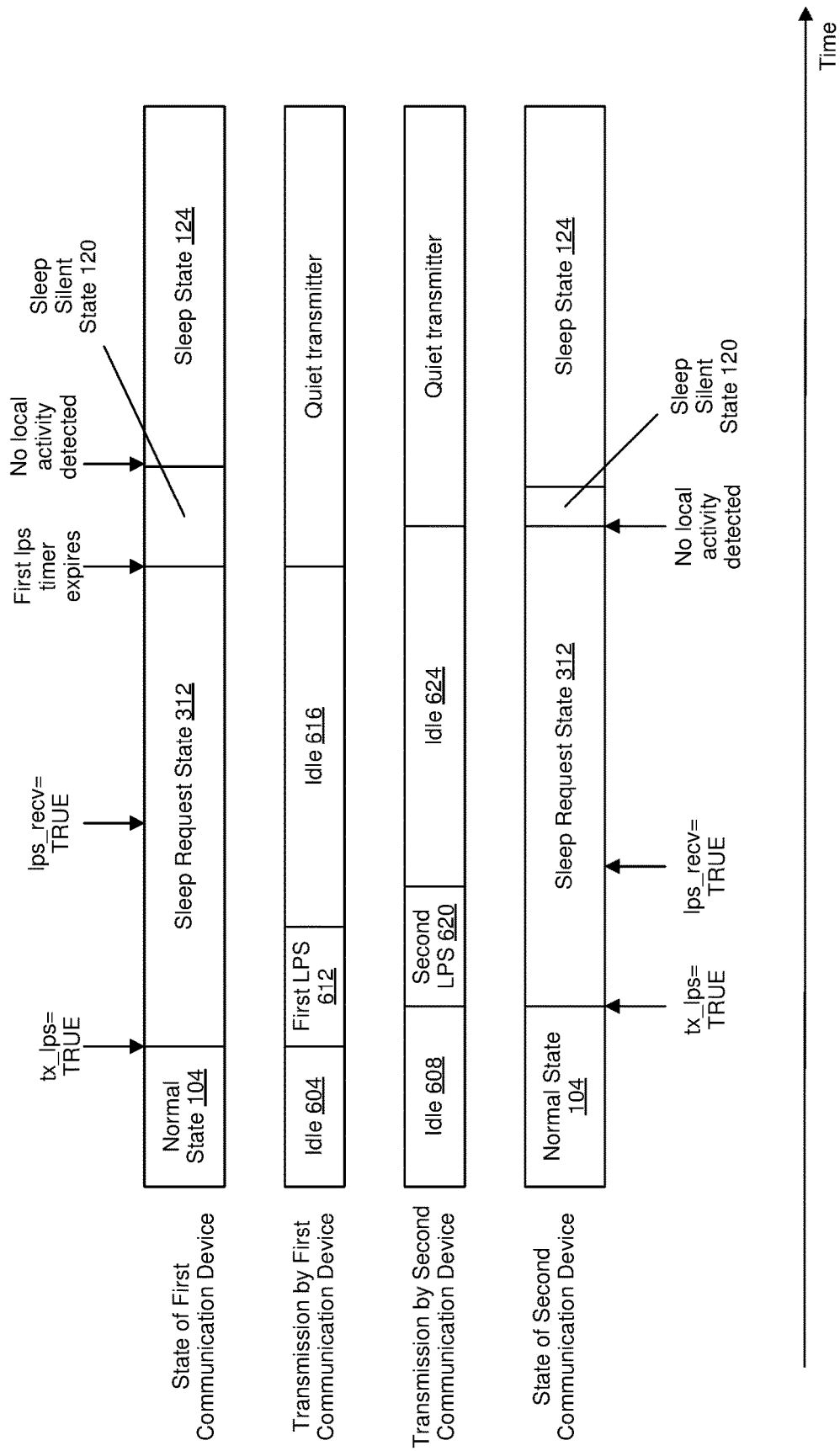
FIG. 6 is a diagram illustrating yet another example scenario in which a first communication device and a second communication device operate according to the state diagram of FIG. 3, according to an embodiment.

FIG. 6 is a diagram 600 illustrating yet another example scenario in which a first communication device and a second communication device operate according to the state diagram 300 of FIG. 3, according to an embodiment.

Initially, the first communication device and the second communication device are in the normal state 104 and are transmitting data and/or idle symbols 604 and data and/or idle symbols 608, respectively. The first communication device transitions to the sleep request state 312 and transmits a first LPS request 612 to the second communication device. Additionally, the first communication device starts a first sleep_req timer and starts a first 1ps timer. After transmitting the first LPS request 612, the first communication device transmits idle symbols 616 (and/or data, optionally).

The second communication device, on its own volition (i.e., not in response to receiving the first LPS request 612), transitions to the sleep request state 312 and transmits a second LPS request 620. Additionally, the second communication device starts a second sleep_req timer and starts a second 1ps timer. After transmitting the second LPS request 620, the second communication device transmits idle symbols 624 (and/or data, optionally). Thus, unlike in the scenario of FIG. 2 in which the second communication device immediately transitions to the sleep silent state 120 and quiets the transmitter of the second communication device after transmitting the second LPS request 220, in the scenario of FIG. 6 the second communication device transmits idle symbols 624 (and/or data, optionally) immediately after transmitting the second LPS request 620. In particular, the second communication device transmits idle symbols 624 (and/or data, optionally) until the earlier of i) the second 1ps timer expires, or ii) the second communication device determines that the first communication device has quieted the transmitter of the first communication device ("no local activity detected").

While the first communication device is in the sleep request state 312, the first communication device detects the second LPS request 620 from the second communication device. Because the first communication device transmitted the first LPS request 612 and received the second LPS request 620, the first communication device determines that the handshaking procedure is completed. In the example scenario of FIG. 6, the first 1ps timer expires after the first communication device determines that the handshaking procedure is completed and prior to the first communication device detecting that the second communication device quieted the transmitter of the second communication device ("no local activity detected"). Thus, in response to the first communication device determining that the first 1ps timer expired, the state machine of the first communication device transitions to the sleep silent state 120 and quiets the transmitter of the first communication device.

While the second communication device is in the sleep request state 312, the second communication device detects the first LPS request 612 from the first communication device. Because the second communication device transmitted the second LPS request 620 and received the first LPS request 612, the second communication device determines that the handshaking procedure is completed. In the example scenario of FIG. 6, the second communication device detects that the first communication device quieted the transmitter of the first communication device ("no local activity detected") prior to the second 1ps timer expiring. Thus, in response to the second communication device detecting that the first communication device quieted the transmitter of the first communication device, the state machine of the second communication device transitions to the sleep silent state 120 and quiets the transmitter of the second communication device.

While in the sleep silent state 120, the first communication device detects no local activity and therefore transitions to the sleep state 124. Similarly, while in the sleep silent state 120, the second communication device detects no local activity and therefore also transitions to the sleep state 124.

Figure 7:
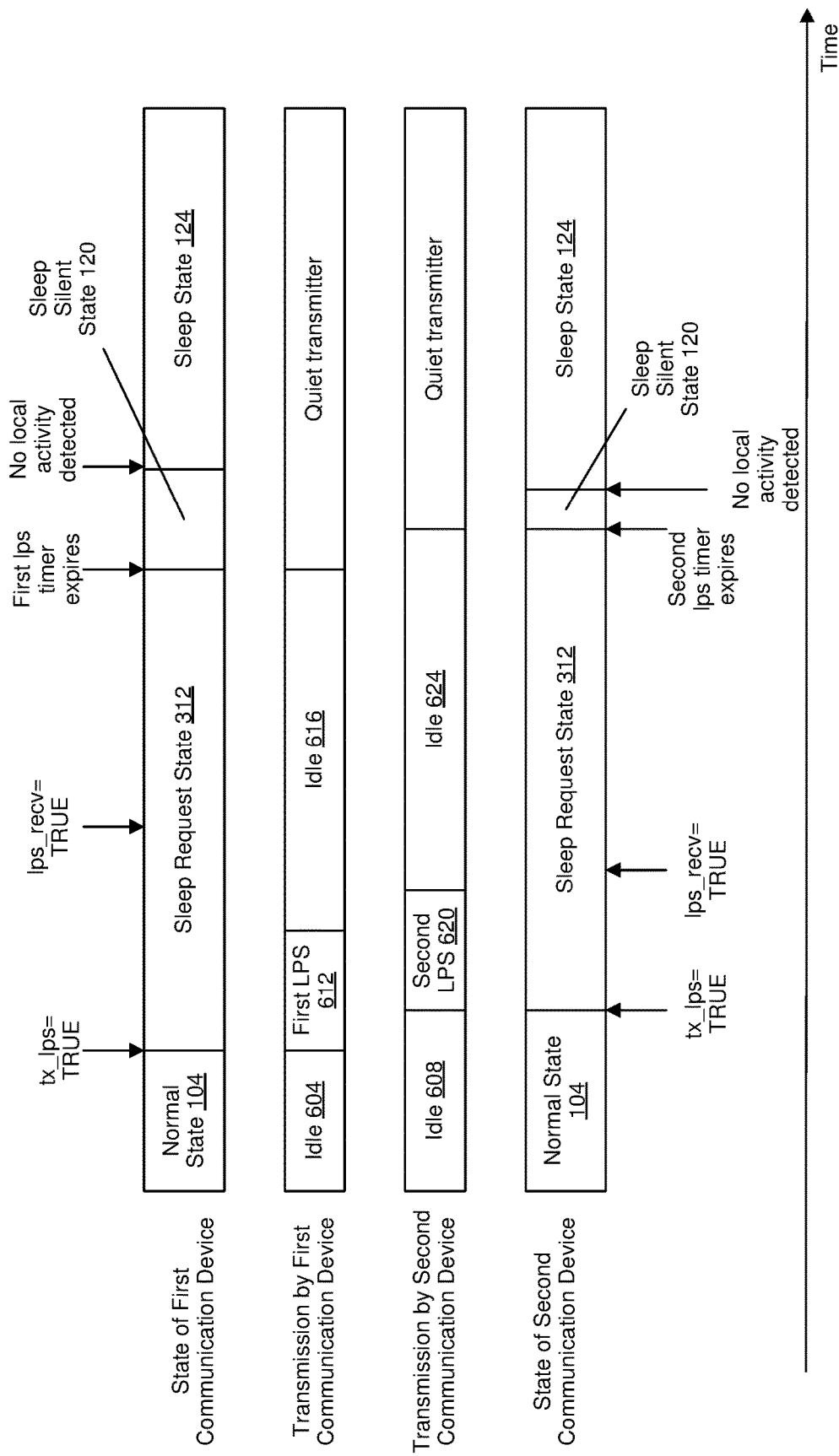
FIG. 7 is a diagram illustrating still another example scenario in which a first communication device and a second communication device operate according to the state diagram of FIG. 3, according to an embodiment.

FIG. 7 is a diagram 700 illustrating still another example scenario in which a first communication device and a second communication device operate according to the state diagram 300 of FIG. 3, according to an embodiment. The diagram 700 is similar to the diagram 600 of FIG. 6 except that the second 1ps timer of the second communication device expires prior to the second communication device determining that the first communication device quieted the transmitter of the first communication device ("no local activity detected"). Thus, in response to the second communication device determining that the first communication device quieted the transmitter of the first communication device ("no local activity detected"), the state machine of the second communication device transitions to the sleep silent state 120 and quiets the transmitter of the second communication device.

While in the sleep silent state 120, the first communication device detects no local activity and therefore transitions to the sleep state 124. Similarly, while in the sleep silent state 120, the second communication device detects no local activity and therefore also transitions to the sleep state 124.

Figure 8:
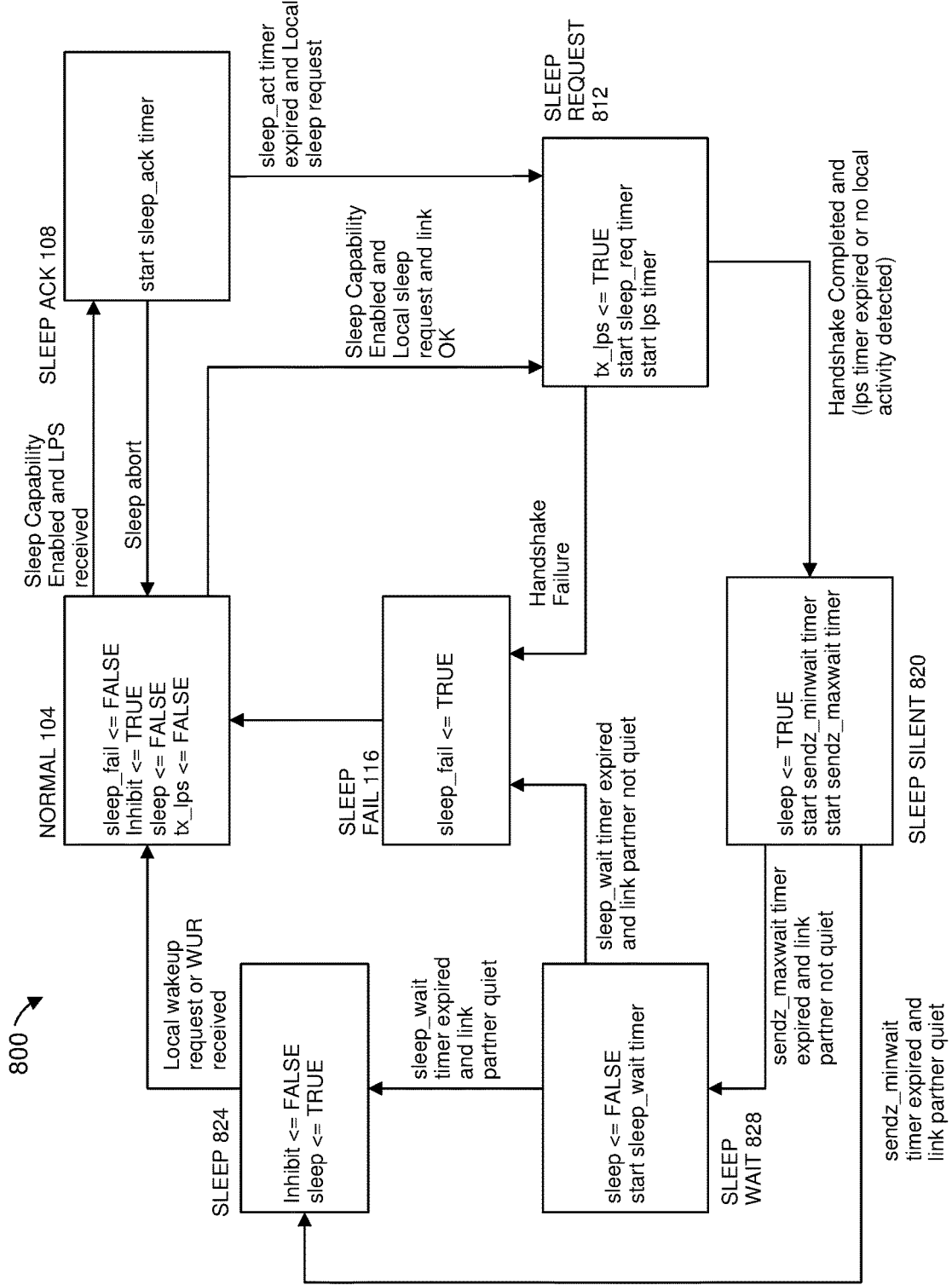
FIG. 8 is a state diagram associated with a communication device transitioning between an active mode of operation and a sleep mode, according to another embodiment.

FIG. 8 is a state diagram 800 associated with a communication device transitioning between an active mode of operation and the sleep mode, according to another embodiment. The state diagram 800 of FIG. 8 is similar to the state diagram 300 of FIG. 3, and like-numbered elements are not discussed again in detail for purposes of brevity.

The state diagram 800 includes a state 812 (sleep request state 812) corresponding to completion of the handshaking procedure discussed above with reference to FIG. 1. Referring again to the normal state 104, if the communication device determines on its own volition (i.e., not in response to an LPS request from the link partner) that the communication device should transition to the sleep mode ("local sleep request") when the communication link with the link partner is up ("link OK") (and when a sleep capability of the PHY processor is enabled), the state machine transitions from the normal state 104 to the sleep request state 812.

In the sleep request state 812, the communication device starts a timer ("sleep_req timer") that measures a time period in which the sleep handshaking procedure discussed above is to be completed. In an embodiment, the sleep_req timer is set to measure a 16 milliseconds time period. In other embodiments, the sleep_req timer is set to measure another suitable time period different from 16 milliseconds.

Also during the sleep request state 812, the communication device transmits an LPS request to the link partner. If the state machine entered the sleep request state 812 via the sleep ack state 108, the LPS request transmitted during the sleep request state 812 is responsive to a previous LPS request received from the link partner, and thus the sleep handshaking procedure is completed upon transmission of the LPS request during the sleep request state 812. On the other hand, if the state machine entered the sleep request state 812 directly from the normal state 104 (i.e., not via the sleep ack state 108), the LPS request transmitted during the sleep request state 812 is a first LPS request and the link partner must transmit a second LPS request to complete the sleep handshaking procedure. Thus, determining whether the sleep handshaking procedure has been completed in the sleep request state 812 includes determining whether an LPS request has been received from the link partner either i) during the sleep request state 812, or ii) in connection with transitioning from the normal state 104 to the sleep ack state 108.

In connection with transmitting the LPS request in the sleep request state 812, the tx_1ps parameter is set to TRUE to indicate that the communication device transmitted the LPS request (or has begun transmitting the LPS request).

Also in state 812, the communication device starts another timer ("1ps timer") that measures a time period that corresponds to a maximum time period for the link partner to receive, process, and recognize the LPS request, according to an embodiment. In an embodiment, the 1ps timer is set to measure a 94.504 microseconds time period, ±0.936 microseconds. In other embodiments, the sleep_req timer is set to measure another suitable time period different from 94.504 microseconds time period, ±0.936 microseconds (e.g., 95.5 microseconds±2 microseconds, 95.5 microseconds±3 microseconds, 90 microseconds±3 microseconds, 100 microseconds±3 microseconds, etc.).

If the communication device determines that the sleep handshaking procedure has not been completed when the sleep_req timer expires, the state machine transitions to the sleep fail state 116 that corresponds to the communication device determining that the transition to the sleep mode failed.

On the other hand, if the communication device determines in the sleep request state 812 that the sleep handshaking procedure has been completed before expiration of the sleep_req timer, the state machine of the communication device waits for the earlier of i) the 1ps timer to expire, and ii) detecting no transmission activity by the link partner, before transitioning to a state 820 ("sleep silent state 820") that corresponds to the communication device quieting transmission by the communication device on the communication link.

In the sleep silent state 820, the communication device sets the sleep parameter to TRUE to indicate that the communication device is in the sleep mode, and quiets transmission by the communication device on the communication link. Additionally, the communication device sets a timer ("sendz_minwait timer") to a duration corresponding to a minimum time the transmitter of the communication device is to be quieted. Also, the communication device sets another timer ("sendz_maxwait timer") to a duration corresponding to a maximum time the transmitter of the communication device can be quieted without causing the link partner to detect that the communication link has failed, according to an embodiment. In an embodiment, the sendz_maxwait timer is set to 1.6 microseconds±120 nanoseconds. In other embodiments, the sendz_maxwait timer is set to another suitable value. The sendz_minwait timer is set to a suitable value less than the sendz_maxwait timer.

In the sleep silent state 820, if the communication device determines that the link partner has quieted its transmitter when the sendz_minwait timer expires, the state machine transitions to a sleep state 824. During the sleep state 824, the sleep parameter is set to TRUE to indicate that the communication device is in the sleep state. Also, the communication device quiets the transmitter of the communication device if the transmitter has not already been quieted. Further during the sleep state 824, the inhibit parameter is set to FALSE to indicate that power supply shutdown is not inhibited, and the communication device enters a low power mode. For example, the PHY processor may be put into a low power mode in which power consumption is significantly reduced (e.g., at least 90% reduced) as compared to the normal operating state 104, according to an embodiment. The PHY processor is unable to transmit (and optionally is unable to receive data and/or idle symbols) in the sleep state 824, according to an embodiment.

During the sleep state 824, if the communication device determines that the communication device should transition to the active mode on its own volition (i.e., not in response to a wake-up command (e.g., a WUP) from the link partner), or in response to receiving a wake-up command (e.g., a WUP) from the link partner, the state machine transitions from the sleep state 824 to the normal state 104. In connection with transitioning from the sleep state 824 to the normal state 104, the communication device exits the low power mode. For example, the power supply to the PHY processor is restored, according to an embodiment.

If the communication device determines in the sleep silent state 820 that the link partner is transmitting on the communication link when the sendz_maxwait timer expires, the state machine transitions to a state 828 ("sleep wait state 828") in which the communication device waits further for the link partner to quiet a transmitter of the link partner. In the sleep wait state 828, the communication device sets the sleep parameter to FALSE to indicate that the communication device is not in the sleep state. Also during the sleep wait state 828, the communication device sets a timer ("sleep_wait timer") corresponding to a duration for which the state machine is to remain in the sleep wait state 828.

If the link partner has still not quieted the transmitter of the link partner when the sleep_wait timer expires, the state machine transitions to the sleep fail state 116. In the sleep fail state 116, the communication device sets the sleep_fail parameter to TRUE to indicate that the transition to the sleep mode failed. Additionally, the state machine transitions to the normal state 104.

On the other hand, if the link partner has quieted the transmitter of the link partner when the sleep_wait timer expires, the state machine transitions to the sleep state 824.

Figure 9:
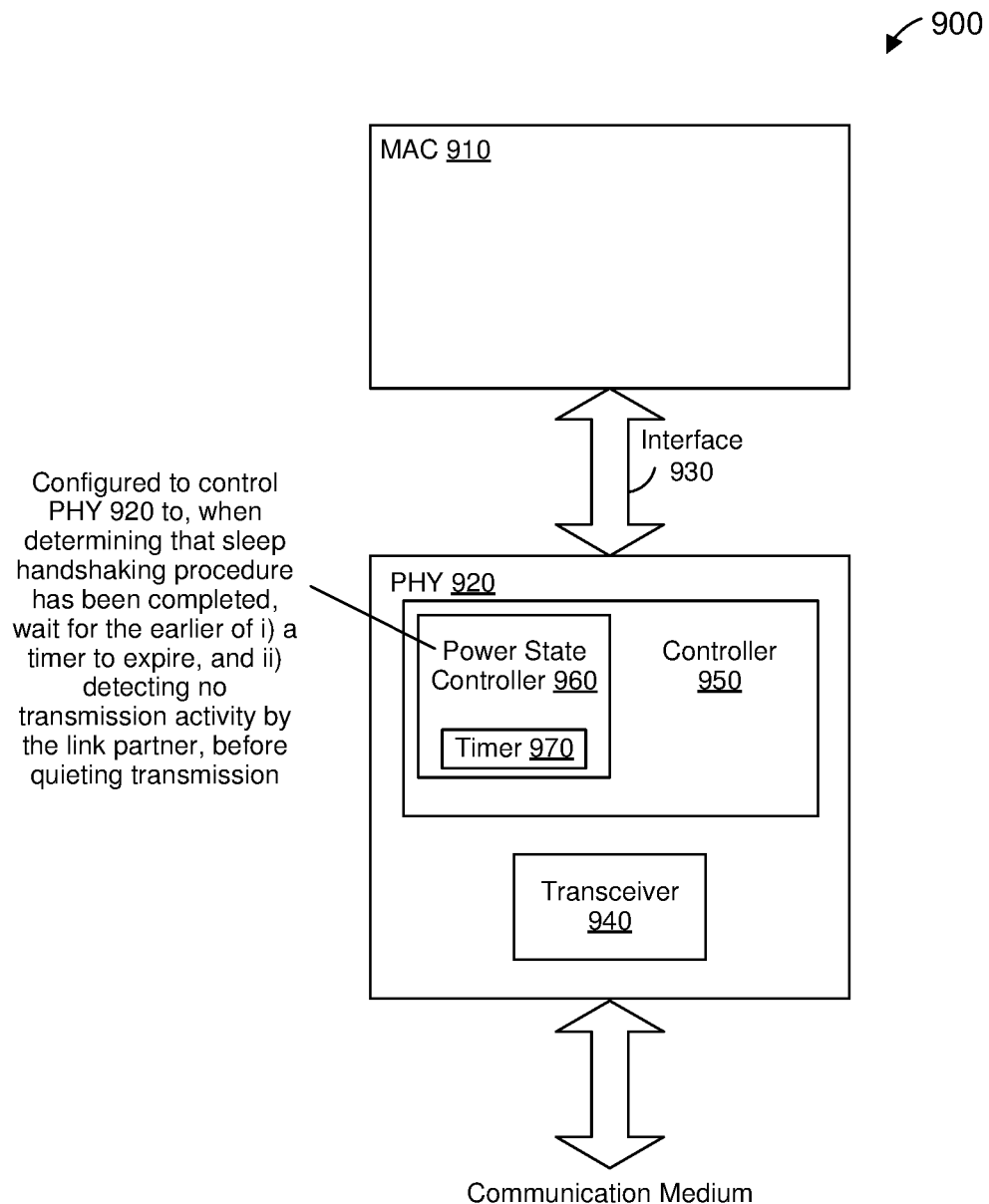
FIG. 9 is a block diagram of an example network interface device that is configured to transition between an active mode and a power saving mode in a manner that avoids the race condition of FIG. 2, according to an embodiment.

FIG. 9 is a block diagram of an example network interface device 900 that is configured to transition between an active mode of operation and a power saving mode, according to an embodiment. The network interface device 900 includes at least a media access control (MAC) processing device 910 (or "MAC processor 910") and a physical layer (PHY) processing device 920 (or "PHY processor 920"). In some embodiments, the MAC processing device 910 and the PHY processing device 920 are compliant with the IEEE 802.3 Ethernet Standard, except as otherwise disclosed below. In other embodiments, the MAC processing device 910 and the PHY processing device 920 are compliant with another suitable communication protocol.

The MAC processing device 910 is configured to perform MAC layer functions associated with a communication protocol such as the communication protocol defined by the IEEE 802.3 Ethernet Standard, a future version of the IEEE 802.3 Ethernet Standard, another suitable communication protocol, etc. Similarly, the PHY processing device 920 is configured to perform PHY functions associated with a communication protocol such as the communication protocol defined by the IEEE 802.3 Ethernet Standard (except as otherwise disclosed below), a future version of the IEEE 802.3 Ethernet Standard, another suitable communication protocol, etc.

In an embodiment the MAC processing device 910 comprises a processor (not shown) and a memory (not shown) coupled to the processor, where the processor is configured to execute machine readable instructions stored in the memory. In an embodiment, the memory stores machine readable instructions that, when executed by the processor, cause the processor to perform MAC layer functions associated with a communication protocol such as the communication protocol defined by the IEEE 802.3 Ethernet Standard, the future version of the IEEE 802.3 Ethernet Standard, the other suitable communication protocol, etc.

In another embodiment the MAC processing device 910 additionally or alternatively comprises a hardware state machine (not shown) configured to perform MAC layer functions associated with a communication protocol such as the communication protocol defined by the IEEE 802.3 Ethernet Standard, the future version of the IEEE 802.3 Ethernet Standard, the other suitable communication protocol, etc.

The MAC processing device 910 is communicatively coupled to the PHY processing device 920 via a communication interface 930 such as a 10 Gigabit Media Independent Interface (XGMII). In other embodiments, the MAC processing device 910 is communicatively coupled to the PHY processing device 920 via another suitable communication interface such as another suitable media independent interface (e.g., the reduced media-independent interface (RMII), the Gigabit Media Independent Interface (GMII), the reduced gigabit media-independent interface (RGMII), the serial gigabit media-independent interface (SGMII), the high serial gigabit media-independent interface (HSGMII), the quad serial gigabit media-independent interface (QSGMII), etc.), according to some embodiments.

In an embodiment, the MAC processing device 910 provides, via the interface 930, data to the PHY processing device 920 for transmission via a suitable communication medium such as a wired, optical, or wireless communication medium. In response to receiving the data from the MAC processing device 910, the PHY processing device 920 encodes, scrambles, and modulates the data to generate a transmission signal for transmitting the data via the communication medium.

In an embodiment, the PHY processing device 920 also receives a receive signal via the communication medium, and demodulates, de-scrambles, and decodes data in the receive signal to generate received data. Additionally, the PHY processing device 920 provides at least some of the received data to the MAC processing device 910 via the interface 930.

The PHY processing device 920 includes one or more encoder devices (not shown), a scrambler device (not shown), and a modulator (not shown) for encoding, scrambling, and modulating data as part of generating a transmission signal, according to an embodiment. The PHY processing device 920 also includes a demodulator (not shown), a de-scrambler device (not shown), and one or more decoder devices (not shown) for demodulating, de-scrambling, and decoding as part of generating the received data, according to an embodiment. In some embodiments, the PHY processing device 920 also includes an analog to digital converter (hereinafter "ADC", not shown) that converts an analog signal received via the communication medium to a digital signal. In some embodiments, the PHY processing device 920 also includes a digital signal processor (hereinafter "DSP", not shown) that processes the digital signal to generate a signal corresponding to modulation symbols that are then demodulated by the demodulator (not shown).

The PHY processing device 920 comprises a transceiver 940 that is configured to transmit the transmission signal and receive the receive signal via the communication medium. In an embodiment, the transceiver 940 includes a transmitter and a receiver (not shown).

In an embodiment, the PHY processing device 920 also comprises a controller 950 that controls operation of the PHY processing device 920. In an embodiment, the controller 950 implements one or more state machines that have states generally corresponding to various operating states and/or modes of the PHY processing device 920. In an embodiment, the controller 950 comprises one or more processors that are configured to execute machine readable instructions stored in one or more memory devices of, or coupled to, the one or more processors, where the machine readable instructions, when executed, cause the one or more processors to implement the one or more state machines. In another embodiments, the controller 950 additionally or alternatively includes one or more hardware state machines that are configured to implement at least one or more portions of the one or more state machines.

The controller 950 is configured to generate control signals that control operation of the PHY processing device 920 according to various operating states and/or modes, and to transition between states of the state machine in response to receiving signals and/or information.

The controller 950 includes and/or implements a power state controller 960 that is configured to implement a state machine in which at least some states of the state machine correspond to various operating modes/states of the PHY processing device 920. In various embodiments, the power state controller 960 includes, or is coupled to, one or more timers, including a timer 970.

In an embodiment, the power state controller 960 implements a state machine the same as or similar to the state machine 300 of FIG. 3, the state machine 800 of FIG. 8, or another suitable state machine that causes the PHY processing device 920 to, in connection with a handshaking procedure for transitioning to a low power mode, wait quieting the transmitter of the PHY processor 920 until one or both of i) the timer 970 expires, and ii) the PHY processor 920 detects no transmission activity by a link partner, according to various embodiments.

In various embodiments, the network interface 900 is configured to perform one of, or any suitable combination of two or more of, methods discussed above with reference to FIGS. 3-8. In various embodiments, the power state controller 960 is configured to perform (alone or in conjunction with the PHY processing device 920 and/or the interface 930) the methods discussed above with reference to FIGS. 3-8.

Figure 10:
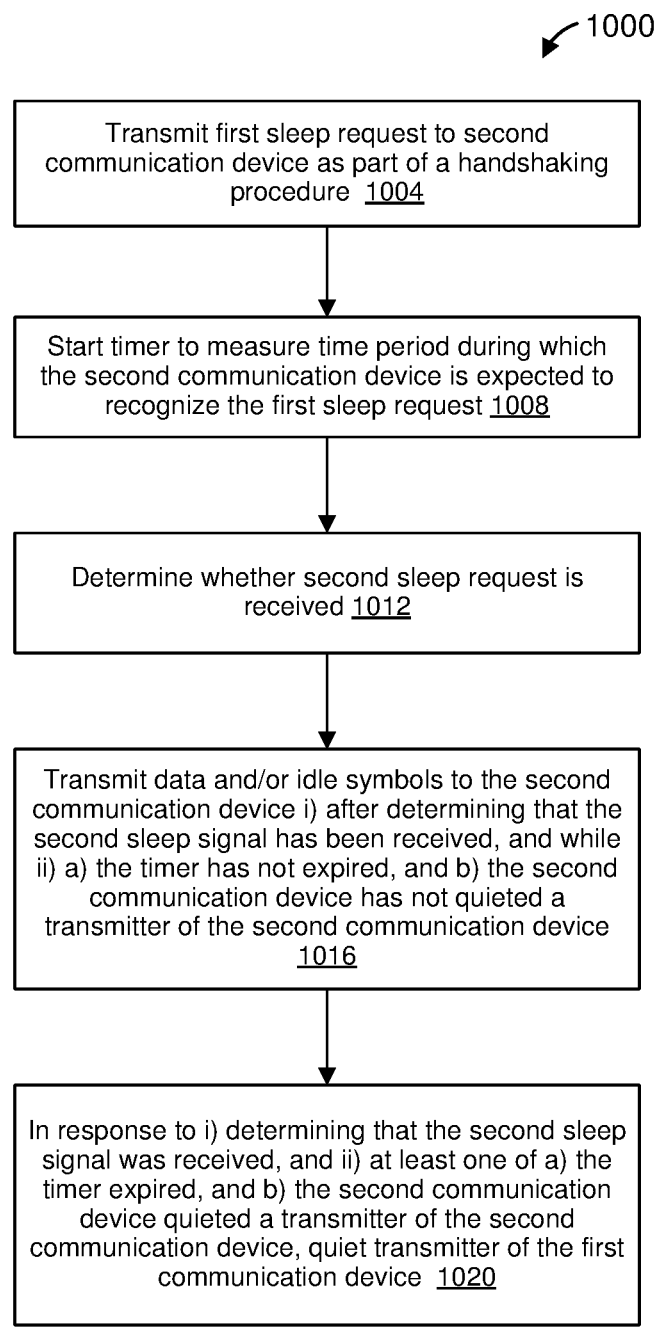
FIG. 10 is a flow diagram of an example method for transitioning between an active mode and a power saving mode in a manner that avoids the race condition of FIG. 2, according to an embodiment.

FIG. 10 is a flow diagram of an example method 1000 for transitioning between an active mode and a power saving mode, according to an embodiment. In an embodiment, the method 1000 is implemented by the network interface 900 of FIG. 9, and FIG. 10 is described with reference to FIG. 9 for ease of explanation. In other embodiments, the method 1000 is implemented by another suitable communication device.

In various embodiments, the method 1000 is implemented in connection with the state diagram 300 of FIG. 3 or the state diagram 800 of FIG. 8, and FIG. 10 is described with reference to FIGS. 3 and 8 for ease of explanation. In other embodiments, the method 1000 is implemented in connection with another suitable state machine that is different than the state diagrams of FIGS. 3 and 8.

At block 1004, a first communication device transmits a first sleep request to a second communication device as part of a handshaking procedure corresponding to transitioning to the low power mode. For example, with reference to FIG. 3, the first communication device transmits a first LPS request in connection with a state machine of the first communication device transitioning to the sleep request state 312, according to an embodiment. As another example, with reference to FIG. 8, the first communication device transmits a first LPS request in connection with the state machine transitioning to the sleep request state 812, according to an embodiment. With reference to FIG. 9, the network interface 900 transmits (e.g., the PHY processor 920 transmits, a transmitter of the PHY processor 920 transmits, etc.) a first LPS request, according to an embodiment. Also with reference to FIG. 9, the power state controller 960 controls the PHY processor 920 to transmit the first LPS request, according to an embodiment.

At block 1008, the first communication device starts a timer to measure a time period during which the second communication device is expected to recognize the first sleep request. For example, with reference to FIG. 3, the first communication device starts an lps timer in connection with the state machine transitioning to the sleep request state 312, according to an embodiment. As another example, with reference to FIG. 8, the first communication device starts an lps timer in connection with the state machine transitioning to the sleep request state 812, according to an embodiment. With reference to FIG. 9, the network interface 900 starts the timer 970 (e.g., the PHY processor 920 starts the timer 970, the controller 950 starts the timer 970, the power state controller 960 starts the timer 970, etc.) a first LPS request, according to an embodiment.

In an embodiment, starting the timer at block 1008 is performed in connection with transmitting the first sleep request at block 1004.

At block 1012, the first communication device determines whether the first communication device received a second sleep request from the second communication device as part of the handshaking procedure. For example, with reference to FIG. 3, the first communication device determines whether the first communication device received a second sleep request from the second communication device while in the sleep request state 312, according to an embodiment. As another example, with reference to FIG. 8, the first communication device determines whether the first communication device received a second sleep request from the second communication device while in the sleep request state 812, according to an embodiment. With reference to FIG. 9, the network interface 900 determines (e.g., the PHY processor 920 determines, the controller 950 determines, the power state controller 960 determines, etc.) whether the PHY processor 920 received a second sleep request from the second communication device, according to an embodiment.

In an embodiment, transmitting the first sleep request at block 1004 is in response to the first communication device receiving the second sleep request.

At block 1016, the first communication device transmits data and/or idle symbols to the second communication device i) after determining that the second sleep request has been received, and while ii) a) the timer has not expired, and b) the second communication device has not quieted a transmitter of the second communication device. For example, with reference to FIG. 3, the first communication device transmits data and/or idle symbols to the second communication device while in the sleep request state 312 i) after determining that the second LPS request has been received, and while ii) a) the lps timer has not expired, and b) the first communication device has determined that the second communication device has not quieted a transmitter of the second communication device, according to an embodiment. As another example, with reference to FIG. 8, the first communication device transmits data and/or idle symbols to the second communication device while in the sleep request state 812 i) after determining that the second LPS request has been received, and while ii) a) the lps timer has not expired, and b) the first communication device has determined that the second communication device has not quieted a transmitter of the second communication device, according to an embodiment. With reference to FIG. 9, the network interface 900 transmits data and/or idle symbols at block 1016 (e.g., the PHY processor 920 transmits data and/or idle symbols, the controller 950 controls the PHY processor 920 to transmit data and/or idle symbols, the power state controller 960 controls the PHY processor 920 to transmit data and/or idle symbols, etc.), according to an embodiment.

At block 1020, in response to i) the first communication device determining that the second sleep request was received, and ii) at least one of a) the timer expired, and b) the second communication device quieted a transmitter of the second communication device, the first communication device quiets a transmitter of the first communication device in connection with transitioning the first communication device to the low power mode. For example, with reference to FIG. 3, the first communication device quiets the transmitter of the first communication device in connection with transitioning from the sleep request state 312 to the sleep silent state 120, according to an embodiment. As another example, with reference to FIG. 8, the first communication device quiets the transmitter of the first communication device in connection with transitioning from the sleep request state 812 to the sleep silent state 820, according to an embodiment. With reference to FIG. 9, the transmitter of the PHY processor 920 is quieted at block 1020 (e.g., the PHY processor 920 quiets the transmitter, the controller 950 controls the PHY processor 920 to quiet the transmitter, the power state controller 960 controls the PHY processor 920 to quiet the transmitter, etc.), according to an embodiment.

In an embodiment, quieting the transmitter of the first communication device at block 1020 begins in response to the earliest of i) the timer expiring, and ii) the first communication device determining that the second communication device quieted the transmitter of the second communication device.

In an embodiment, the timer that is started at block 1008 is a first timer, and time period measured by the first timer is a first time period; and the method 1000 further comprises: starting a second timer of the first communication device, the second timer configured to measure a second time period during which the first communication device is expected to receive the second sleep request from the second communication device as part of the handshaking procedure, and determining, at the first communication device, whether the first communication device received the second sleep request from the second communication device prior to the second timer expiring; and transmitting the data and/or idle symbols to the second communication device at block 1016 occurs after determining that the first communication device received the second sleep request from the second communication device prior to the second timer expiring.

Figure 11:
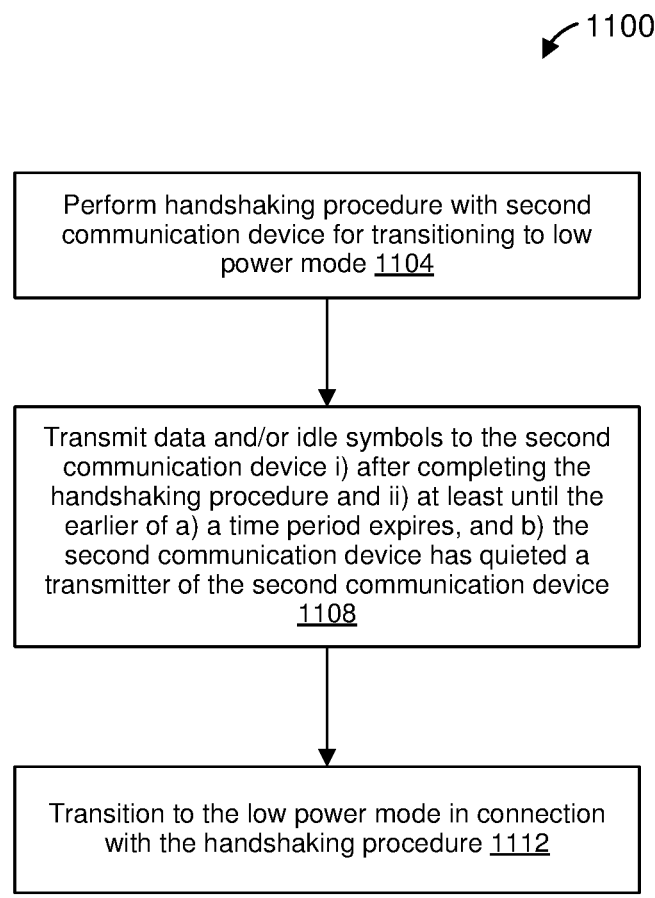
FIG. 11 is a flow diagram of another example method for transitioning between an active mode and a power saving mode in a manner that avoids the race condition of FIG. 2, according to another embodiment.

FIG. 11 is a flow diagram of another example method 1100 for transitioning between an active mode and a power saving mode, according to an embodiment. In an embodiment, the method 1200 is implemented by the network interface 900 of FIG. 9, and FIG. 11 is described with reference to FIG. 9 for ease of explanation. In other embodiments, the method 1100 is implemented by another suitable communication device.

In various embodiments, the method 1100 is implemented in connection with the state diagram 300 of FIG. 3 or the state diagram 800 of FIG. 8, and FIG. 11 is described with reference to FIGS. 3 and 8 for ease of explanation. In other embodiments, the method 1100 is implemented in connection with another suitable state machine that is different than the state diagrams of FIGS. 3 and 8.

At block 1104, a first communication device performs (e.g., the PHY processor 920 performs, the controller 950 performs, the power state controller 960 performs, etc.) a handshaking procedure with a second communication device for transitioning to a low power mode. In an embodiment, performing the handshaking procedure at block 1104 includes the first communication device transmitting (e.g., the PHY processor 920 transmitting, a transmitter of the PHY processor 920 transmitting, etc.) a first sleep request to a second communication device as part of a handshaking procedure corresponding to transitioning to the low power mode. For example, with reference to FIG. 3, the first communication device transmits a first LPS request in connection with a state machine of the first communication device transitioning to the sleep request state 312, according to an embodiment. As another example, with reference to FIG. 8, the first communication device transmits a first LPS request in connection with the state machine transitioning to the sleep request state 812, according to an embodiment. With reference to FIG. 9, the network interface 900 transmits (e.g., the PHY processor 920 transmits, a transmitter of the PHY processor 920 transmits, etc.) a first LPS request, according to an embodiment. Also with reference to FIG. 9, the power state controller 960 controls the PHY processor 920 to transmit the first LPS request, according to an embodiment.

At block 1108, the first communication device transmits data and/or idle symbols to the second communication device i) after completing the handshaking procedure, and ii) at least until the earlier of a) a time period has expired, and b) the second communication device has quieted a transmitter of the second communication device. For example, with reference to FIG. 3, the first communication device transmits data and/or idle symbols to the second communication device while in the sleep request state 312 i) after determining that the second LPS request has been received, and ii) at least until the earlier of a) the 1ps timer expiring, and b) the first communication device determining that the second communication device has quieted a transmitter of the second communication device, according to an embodiment. As another example, with reference to FIG. 8, the first communication device transmits data and/or idle symbols to the second communication device while in the sleep request state 812 i) after determining that the second LPS request has been received, and ii) at least until the earlier of a) the 1ps timer expiring, and b) the first communication device determining that the second communication device has quieted a transmitter of the second communication device, according to an embodiment. With reference to FIG. 9, the network interface 900 transmits data and/or idle symbols at block 1108 (e.g., the PHY processor 920 transmits data and/or idle symbols, the controller 950 controls the PHY processor 920 to transmit data and/or idle symbols, the power state controller 960 controls the PHY processor 920 to transmit data and/or idle symbols, etc.), according to an embodiment.

At block 1112, the first communication device transitions to the low power mode in connection with the handshaking procedure performed at block 1104.

In an embodiment, in connection with determining whether the time period has expired at block 1108, the method 1100 further includes the first communication device starting a timer to measure a time period during which the second communication device is expected to recognize the first sleep request. For example, with reference to FIG. 3, the first communication device starts an 1ps timer in connection with the state machine transitioning to the sleep request state 312, according to an embodiment. As another example, with reference to FIG. 8, the first communication device starts an 1ps timer in connection with the state machine transitioning to the sleep request state 812, according to an embodiment. With reference to FIG. 9, the network interface 900 starts the timer 970 (e.g., the PHY processor 920 starts the timer 970, the controller 950 starts the timer 970, the power state controller 960 starts the timer 970, etc.) a first LPS request, according to an embodiment.

In an embodiment, starting the timer is performed in connection with transmitting a first sleep request as part of performing the handshaking procedure at block 1104.

In an embodiment, when the handshaking procedure includes transmitting the first sleep request, and in connection with determining whether the handshaking procedure is completed at block 1108, the method further includes the first communication device determining whether the first communication device received a second sleep request from the second communication device as part of the handshaking procedure. For example, with reference to FIG. 3, the first communication device determines whether the first communication device received a second sleep request from the second communication device while in the sleep request state 312, according to an embodiment. As another example, with reference to FIG. 8, the first communication device determines whether the first communication device received a second sleep request from the second communication device while in the sleep request state 812, according to an embodiment. With reference to FIG. 9, the network interface 900 determines (e.g., the PHY processor 920 determines, the controller 950 determines, the power state controller 960 determines, etc.) whether the PHY processor 920 received a second sleep request from the second communication device, according to an embodiment.

In an embodiment, the method 1100 further includes, in connection with transitioning to the low power mode at block 1112, quieting the transmitter of the first communication device. In an embodiment in which the first communication device transmits a first sleep request as part of the handshaking procedure, in response to i) the first communication device determining that the second sleep request was received, and ii) at least one of a) the time period expiring, and b) the second communication device quieted a transmitter of the second communication device, the first communication device quiets a transmitter of the first communication device in connection with transitioning the first communication device to the low power mode. For example, with reference to FIG. 3, the first communication device quiets the transmitter of the first communication device in connection with transitioning from the sleep request state 312 to the sleep silent state 120, according to an embodiment. As another example, with reference to FIG. 8, the first communication device quiets the transmitter of the first communication device in connection with transitioning from the sleep request state 812 to the sleep silent state 820, according to an embodiment. With reference to FIG. 9, the transmitter of the PHY processor 920 is quieted at block 1020 (e.g., the PHY processor 920 quiets the transmitter, the controller 950 controls the PHY processor 920 to quiet the transmitter, the power state controller 960 controls the PHY processor 920 to quiet the transmitter, etc.), according to an embodiment.

In an embodiment in which the first communication device sets a timer as discussed above, quieting the transmitter of the first communication device begins in response to the earliest of i) the timer expiring, and ii) the first communication device determining that the second communication device quieted the transmitter of the second communication device.

In an embodiment in which the first communication device sets a timer and transmits a first sleep request as discussed above, the timer is a first timer, and time period measured by the first timer is a first time period; and the method 1100 further comprises: starting a second timer of the first communication device, the second timer configured to measure a second time period during which the first communication device is expected to receive the second sleep request from the second communication device as part of the handshaking procedure, and determining, at the first communication device, whether the first communication device received the second sleep request from the second communication device prior to the second timer expiring; and transmitting the data and/or idle symbols to the second communication device at block 1108 occurs after determining that the first communication device received the second sleep request from the second communication device prior to the second timer expiring.

Embodiment 1: A first communication device, comprising: a physical layer (PHY) processor comprising a transceiver, the PHY processor being configured to perform PHY functions associated with a communication link including transmitting information to a second communication device via a communication medium corresponding to the communication link and receiving information from the second communication device via the communication medium, wherein the PHY processor is configured to transition between an active mode and a low power mode; and a controller, the controller being configured to: control the PHY processor to perform a handshaking procedure with the second communication device for transitioning to the low power mode, control the PHY processor to continue to transmit data and/or idle symbols to the second communication device i) after completion of the handshake procedure, and ii) at least until the earlier of a) a time period expiring, and b) determining that the second communication device quieted a transmitter of the second communication device, and control the PHY processor to transition to the low power mode in connection with the handshaking procedure.

Embodiment 2: The first communication device of embodiment 1, wherein the controller is configured to begin quieting of the transmitter as part of transitioning the PHY processor to the low power mode in response to the earlier of i) the time period expiring, and ii) determining that the second communication device quieted the transmitter of the second communication device.

Embodiment 3: The first communication device of either of embodiments 1 or 2, wherein the controller is configured to control the PHY processor to continue to transmit data and/or idle symbols to the second communication device i) after completion of the handshake procedure, and ii) until at least the earlier of a) the time period expiring, and b) determining that the second communication device quieted the transmitter of the second communication device to ensure that the second communication device will not inadvertently determine that the communication link between the first communication device and the second communication device has failed before the second communication device determines that the handshake procedure is completed.

Embodiment 4: The first communication device of any of embodiments 1-3, wherein the controller comprises a timer, and wherein the controller is configured to: control the PHY processor to transmit a first sleep request to the second communication device as part of the handshaking procedure; start the timer, the timer being configured to measure a time period during which the second communication is expected to recognize the first sleep request; determine whether the PHY processor received a second sleep request from the second communication device as part of the handshaking procedure; and control the PHY processor to continue to transmit data and/or idle symbols to the second communication device i) after determining that the PHY processor received the second sleep request, and ii) until at least the earlier of a) the timer expiring, and b) determining that the second communication device quieted the transmitter of the second communication device.

Embodiment 5: The first communication device of embodiment 4, wherein the controller is configured to start the timer in connection with transmitting the first sleep request.

Embodiment 6: The first communication device of either of embodiments 4 or 5, wherein the controller is configured to control the PHY processor to transmit the first sleep request in response to the first communication device receiving the second sleep request.

Embodiment 7: The first communication device of any of embodiments 4-6, wherein: the timer is configured to measure approximately 94.5 microseconds.

Embodiment 8: The first communication device of embodiment 7, wherein: the timer is configured to measure 94.504 microseconds, ±0.936 microseconds.

Embodiment 9: The first communication device of any of embodiments 4-8, wherein: the timer is a first timer; the time period is a first time period; the controller further comprises a second timer that is configured to measure a second time period during which the first communication device is expected to receive the second sleep request from the second communication device as part of the handshaking procedure; and the controller is further configured to: start the second timer, determine whether the first communication device received the second sleep request from the second communication device prior to the second timer expiring, and control the PHY processor to transmit data and/or idle symbols to the second communication device after determining that the first communication device received the second sleep request from the second communication device prior to the second timer expiring.

Embodiment 10: The first communication device of any of embodiments 1-9, wherein the controller is a component of the PHY processor.

Embodiment 11: The first communication device of any of embodiments 1-10, wherein the controller further comprises: a processor; and a memory coupled to the processor, the memory storing instructions that, when executed by the processor, cause the processor to: control the PHY processor to perform the handshaking procedure with the second communication device, and control the PHY processor to continue to transmit data and/or idle symbols to the second communication device i) after completion of the handshake procedure, and ii) at least until the earlier of a) the time period expiring, and b) determining that the second communication device quieted the transmitter of the second communication device.

Embodiment 12: The first communication device of any of embodiments 1-11, wherein the controller further comprises a hardware state machine configured to transition between a plurality of states; and wherein the plurality of states includes a first state corresponding to: controlling the PHY processor to transmit a sleep request to the second communication device as part of the handshaking procedure; and controlling the PHY processor to continue to transmit data and/or idle symbols to the second communication device i) after completion of the handshake procedure, and ii) at least until the earlier of a) the time period expiring, and b) determining that the second communication device quieted the transmitter of the second communication device.

Embodiment 13: A method for transitioning a first communication device between an active mode and a low power mode, the method comprising: performing, by the first communication device, a handshaking procedure with a second communication device for transitioning to the low power mode; transmitting, by the first communication device, data and/or idle symbols to the second communication device i) after completion of the handshake procedure, and ii) at least until the earlier of a) a time period expiring, and b) determining that the second communication device quieted a transmitter of the second communication device; and transitioning the first communication device to the low power mode in connection with the handshaking procedure.

Embodiment 14: The method of embodiment 13, further comprising: quieting the transmitter of the first communication device as part of transitioning to the low power mode in response to the earlier of i) the time period expiring, and ii) determining that the second communication device quieted the transmitter of the second communication device.

Embodiment 15: The method of either of embodiments 13 or 14, wherein transmitting data and/or idle symbols to the second communication device i) after completion of the handshake procedure, and ii) until at least the earlier of a) the time period expiring, and b) determining that the second communication device quieted the transmitter of the second communication device ensures that the second communication device will not inadvertently determine that the communication link between the first communication device and the second communication device has failed before the second communication device determines that the handshake procedure is completed.

Embodiment 16: The method of any of embodiments 13-15, wherein: performing the handshaking procedure includes transmitting, by the first communication device, a first sleep request to the second communication device and determining, by the first communication device, whether the first communication device received a second sleep request from the second communication device; the method further comprises: starting a timer of the first communication device, the timer being configured to measure a time period during which the second communication is expected to recognize the first sleep request; and transmitting data and/or idle symbols to the second communication device i) after completion of the handshake procedure, and ii) at least until the earlier of a) the time period expiring, and b) determining that the second communication device quieted the transmitter of the second communication device comprises transmitting data and/or idle symbols to the second communication device i) after determining that the first communication device received the second sleep request, and ii) until at least the earlier of a) the timer expiring, and b) determining that the second communication device quieted the transmitter of the second communication device.

Embodiment 17: The method of embodiment 16, wherein starting the timer is performed in connection with transmitting the first sleep request.

Embodiment 18: The method of either of embodiments 16 or 17, wherein transmitting the first sleep request is in response to the first communication device receiving the second sleep request.

Embodiment 19: The method of any of embodiments 16-18, further comprising: setting the timer to measure approximately 94.5 microseconds.

Embodiment 20: The method of embodiment 19, wherein setting the timer comprises: setting the timer to measure 94.504 microseconds, ±0.936 microseconds.

Embodiment 21: The method of any of embodiments 16-20, wherein: the timer is a first timer; the time period is a first time period; the method further comprises: starting a second timer of the first communication device, the second timer configured to measure a second time period during which the first communication device is expected to receive the second sleep request from the second communication device as part of the handshaking procedure, and determining, at the first communication device, whether the first communication device received the second sleep request from the second communication device prior to the second timer expiring; and transmitting data and/or idle symbols to the second communication device comprises transmitting the data and/or idle symbols after determining that the first communication device received the second sleep request from the second communication device prior to the second timer expiring.

Embodiment 22: A first communication device, comprising: a physical layer (PHY) processor comprising a transceiver, the PHY processor being configured to perform PHY functions associated with a communication link including transmitting information to a second communication device via a communication medium corresponding to the communication link and receiving information from the second communication device via the communication medium, wherein the PHY processor is configured to transition between an active mode and a low power mode; and a controller having a timer, the controller being configured to: control the PHY processor to transmit a first sleep request to the second communication device as part of a handshaking procedure for transitioning to the low power mode, start the timer, the timer configured to measure a time period during which the second communication is expected to recognize the first sleep request, determine whether the PHY processor received a second sleep request from the second communication device as part of the handshaking procedure, control the PHY processor to transmit idle symbols to the second communication device i) after determining that the PHY processor received the second sleep request from the second communication device, and while ii) a) the timer has not expired, and b) the controller has determined that the second communication device has not quieted a transmitter of the second communication device, wherein transmitting the idle symbols ensures that the second communication device will not inadvertently determine, before the second communication device detects the first sleep request, that the communication link between the first communication device and the second communication device has failed, and in response to i) determining that the PHY processor received the second sleep request from the second communication device, and ii) at least one of a) the timer expiring, and b) determining that the second communication device quieted a transmitter of the second communication device, quieting a transmitter of the transceiver of the PHY processor as part of transitioning the PHY processor to the low power mode.

Embodiment 23: The first communication device of embodiment 22, wherein the controller is configured to begin quieting of the transmitter in response to the earliest of i) the timer expiring, and ii) determining that the second communication device quieted the transmitter of the second communication device.

Embodiment 24: The first communication device of either of embodiments 22 or 23, wherein the controller is configured to start the timer in connection with transmitting the first sleep request.

Embodiment 25: The first communication device of any of embodiments 22-24, wherein the controller is configured to control the PHY processor to transmit the first sleep request in response to the first communication device receiving the second sleep request.

Embodiment 26: The first communication device of any of embodiments 22-25, wherein: the timer is configured to measure approximately 94.5 microseconds.

Embodiment 27: The first communication device of embodiment 26, wherein: the timer is configured to measure 94.504 microseconds, ±0.936 microseconds.

Embodiment 28: The first communication device of any of embodiments 22-27, wherein the controller is configured to set the timer to measure approximately 94.5 microseconds.

Embodiment 29: The first communication device of any of embodiments 22-28, wherein: the timer is a first timer; the time period is a first time period; the controller further comprises a second timer that is configured to measure a second time period during which the first communication device is expected to receive the second sleep request from the second communication device as part of the handshaking procedure; and the controller is further configured to: start the second timer, determine whether the first communication device received the second sleep request from the second communication device prior to the second timer expiring, and control the PHY processor to transmit the idle symbols to the second communication device after determining that the first communication device received the second sleep request from the second communication device prior to the second timer expiring.

Embodiment 30: The first communication device of any of embodiments 22-29, wherein the controller is a component of the PHY processor.

Embodiment 31: The first communication device of any of embodiments 22-29, wherein the controller further comprises: a processor; and a memory coupled to the processor, the memory storing instructions that, when executed by the processor, cause the processor to: control the PHY processor to transmit the first sleep request to the second communication device as part of the handshaking procedure, start the timer, determine whether the PHY processor received the second sleep request from the second communication device as part of the handshaking procedure, control the PHY processor to transmit the idle symbols to the second communication device, and in response to i) determining that the PHY processor received the second sleep request from the second communication device, and ii) at least one of a) the timer expiring, and b) determining that the second communication device quieted a transmitter of the second communication device, quiet the transmitter of the transceiver of the PHY processor.

Embodiment 32: The first communication device of any of embodiments 22-31, wherein the controller further comprises a hardware state machine configured to transition between a plurality of states; and wherein the plurality of states includes a first state corresponding to: controlling the PHY processor to transmit the first sleep request to the second communication device as part of the handshaking procedure; starting the timer; determine whether the PHY processor received the second sleep request from the second communication device as part of the handshaking procedure; and controlling the PHY processor to transmit the idle symbols to the second communication device.

Embodiment 33: A method for transitioning a first communication device between an active mode and a low power mode, the method comprising: transmitting, by the first communication device, a first sleep request to a second communication device as part of a handshaking procedure for transitioning to the low power mode; starting a timer of the first communication device, the timer configured to measure a time period during which the second communication is expected to recognize the first sleep request; determining, at the first communication device, whether the first communication device received a second sleep request from the second communication device as part of the handshaking procedure; transmitting, by the first communication device, idle symbols to the second communication device i) after determining that the first communication device received the second sleep request from the second communication device, and while ii) a) the timer has not expired, and b) the first communication device has determined that the second communication device has not quieted a transmitter of the second communication device, wherein transmitting the idle symbols ensures that the second communication device will not inadvertently determine, before the second communication device detects the first sleep request, that a communication link between the first communication device and the second communication device has failed; and in response to i) determining that the first communication device received the second sleep request from the second communication device, and ii) at least one of a) the timer expiring, and b) determining that the second communication device quieted a transmitter of the second communication device, quieting a transmitter of the first communication device as part of transitioning to the low power mode.

Embodiment 34: The method of embodiment 33, wherein quieting the transmitter of the first communication device as part of transitioning to the low power mode begins in response to the earliest of i) the timer expiring, and ii) determining that the second communication device quieted the transmitter of the second communication device.

Embodiment 35: The method of either of embodiments 33 or 34, wherein starting the timer is performed in connection with transmitting the first sleep request.

Embodiment 36: The method of any of embodiments 33-35, wherein transmitting the first sleep request is in response to the first communication device receiving the second sleep request.

Embodiment 37: The method of any of embodiments 33-36, further comprising: setting the timer to measure approximately 94.5 microseconds.

Embodiment 38: The method of embodiment 37, wherein setting the timer comprises: setting the timer to measure 94.504 microseconds, ±0.936 microseconds.

Embodiment 39: The method of any of embodiments 33-38, wherein: the timer is a first timer; the time period is a first time period; the method further comprises: starting a second timer of the first communication device, the second timer configured to measure a second time period during which the first communication device is expected to receive the second sleep request from the second communication device as part of the handshaking procedure, and determining, at the first communication device, whether the first communication device received the second sleep request from the second communication device prior to the second timer expiring; and transmitting the idle symbols to the second communication device comprises transmitting the idle symbols after determining that the first communication device received the second sleep request from the second communication device prior to the second timer expiring.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:
1. A first communication device, comprising:
a physical layer (PHY) processor comprising a transceiver, the PHY processor being configured to perform PHY functions associated with a communication link including transmitting information to a second communication device via a communication medium corresponding to the communication link and receiving information from the second communication device via the communication medium, wherein the PHY processor is configured to transition between an active mode and a low power mode; and a controller having a timer, the controller being configured to:
  in response to determining that the PHY processor is to transition to the low power mode, enter a first logic state in which the controller i) controls the PHY processor to transmit a first sleep request to the second communication device via the communication medium, ii) starts the timer, and iii) controls the PHY processor to continue to transmit data and/or idle symbols to the second communication device while in the first logic state,
  in response to i) determining that the second communication device transmitted a second sleep request corresponding to the first sleep request, and ii) the earlier of a) the timer expiring, and b) determining that the second communication device quieted a transmitter of the second communication device after transmitting the second sleep request, transition from the first logic state to a second logic state in which the controller controls the PHY processor to quiet a transmitter of the first communication device as part of transitioning the PHY processor to the low power mode, and
  control the PHY processor to transition to the low power mode after transitioning to the second logic state.

2. The first communication device of claim 1, wherein the controller is configured to transition from the first logic state to the second logic state in response to:
  determining that i) the timer expired and ii) the first communication device has received the second sleep request from the second communication device; and
  determining that the second communication device quieted the transmitter of the second communication device after the first communication device received the second sleep request from the second communication device.

3. The first communication device of claim 1, wherein:
  the timer is configured to measure a time period during which the second communication is expected to recognize the first sleep request; and
  the controller is configured to control the PHY processor to quiet the transmitter of the first communication device while in the second logic state after the timer expires to prevent the quieting of the transmitter of the first communication device prior to the second communication device recognizing the first sleep request.

4. The first communication device of claim 1, wherein the controller is configured to start the timer in connection with transmitting the first sleep request.

5. The first communication device of claim 1, wherein the controller is configured to control the PHY processor to transmit the first sleep request in response to the first communication device receiving the second sleep request.

6. The first communication device of claim 1, wherein:
  the timer is configured to measure approximately 94.5 microseconds.

7. The first communication device of claim 6, wherein:
  the timer is configured to measure 94.504 microseconds, +0.936 microseconds.

8. The first communication device of claim 1, wherein:
  the timer is a first timer;
  the time period is a first time period;
  the controller further comprises a second timer that is configured to measure a second time period during which the first communication device is expected to receive the second sleep request from the second communication device as part of the handshaking procedure; and
  the controller is further configured to:
    start the second timer while in the first logic state, and
    in response to determining that the second timer expired prior to receiving the second sleep request from the second communication device as part of the handshaking procedure, transition from the first logic state to a third logic state that corresponds to failure of the handshaking procedure.

9. The first communication device of claim 1, wherein the controller is configured to:
  determine that the PHY processor is to transition to the low power mode in response to receiving the second sleep request from the second communication device.

10. The first communication device of claim 1, wherein the controller is a component of the PHY processor.

11. The first communication device of claim 1, wherein the controller further comprises:
  a processor; and
  a memory coupled to the processor, the memory storing instructions that, when executed by the processor, cause the processor to:
    enter the first logic state, and
    transition from the first logic state to the second logic state.

12. The first communication device of claim 1, wherein the controller further comprises a hardware state machine configured to transition between a plurality of states, the plurality of states including the first state and the second state.

13. A method for transitioning a first communication device between an active mode and a low power mode, the method comprising:
  in response to determining that a physical layer processor of the first communication device is to transition to the low power mode, entering, by a controller of the first communication device, a first logic state in which the controller i) controls the PHY processor to transmit a first sleep request to a second communication device via a communication medium, ii) starts a timer, and iii) controls the PHY processor to continue to transmit data and/or idle symbols to the second communication device while in the first logic state;
  in response to i) determining that the second communication device transmitted a second sleep request corresponding to the first sleep request, and ii) the earlier of a) the timer expiring, and b) determining that the second communication device quieted a transmitter of the second communication device after transmitting the second sleep request, transitioning, by the controller, from the first logic state to a second logic state in which the controller controls the PHY processor to quiet a transmitter of the first communication device as part of transitioning the PHY processor to the low power mode; and
  transitioning the PHY processor to the low power mode after the controller transitions to the second logic state.

14. The method for transitioning the first communication device between the active mode and the low power mode of claim 13, wherein transitioning from the first logic state to the second logic state is in response to at least one of:
  determining, by the controller, that i) the timer expired and ii) the first communication device has received the second sleep request from the second communication device; and determining, by the controller, that the second communication device quieted the transmitter of the second communication device after the first communication device received the second sleep request from the second communication device.

15. The method for transitioning the first communication device between the active mode and the low power mode of claim 13, wherein:
the timer is configured to measure a time period during which the second communication is expected to recognize the first sleep request; and
controlling the PHY processor to quiet the transmitter while in the second logic state after the timer expires is to prevent quieting the transmitter of the first communication device prior to the second communication device recognizing the first sleep request.

16. The method for transitioning the first communication device between the active mode and the low power mode of claim 13, wherein starting the timer is in connection with transmitting the first sleep request.

17. The method for transitioning the first communication device between the active mode and the low power mode of claim 13, wherein controlling the PHY processor to transmit the first sleep request is in response to the first communication device receiving the second sleep request.

18. The method for transitioning the first communication device between the active mode and the low power mode of claim 13, wherein starting the timer comprises:
starting the timer to measure approximately 94.5 microseconds.

19. The method for transitioning the first communication device between the active mode and the low power mode of claim 18, wherein starting the timer comprises:
starting the timer to measure 94.504 microseconds, ±0.936 microseconds.

20. The method for transitioning the first communication device between the active mode and the low power mode of claim 13, wherein:
the timer is a first timer;
the time period is a first time period;
the method further comprises:
starting, by the controller, a second timer while in the first logic state, the second timer configured to measure a second time period during which the first communication device is expected to receive the second sleep request from the second communication device as part of the handshaking procedure, and
in response to determining that the second timer expired prior to receiving the second sleep request from the second communication device as part of the handshaking procedure, transitioning the controller from the first logic state to a third logic state that corresponds to failure of the handshaking procedure.

21. The method for transitioning the first communication device between the active mode and the low power mode of claim 13, wherein determining that the PHY processor is to transition to the low power mode is in response to receiving the second sleep request from the second communication device.

* * * * *

UNITED STATES PATENT AND TRADEMARK OFFICE
CERTIFICATE OF CORRECTION

| | |
|---|---|
| PATENT NO. | : 12,113,643 B2 |
| APPLICATION NO. | : 18/502963 |
| DATED | : October 8, 2024 |
| INVENTOR(S) | : Hon Wai Fung and Dance Wu |

It is certified that error appears in the above-identified patent and that said Letters Patent is hereby corrected as shown below:

On the Title Page

Item (73) in the assignee section, the word "Marvel" should be --Marvell--.

Signed and Sealed this
Nineteenth Day of November, 2024

Katherine Kelly Vidal
*Director of the United States Patent and Trademark Office*